(12) United States Patent
Yamada et al.

(10) Patent No.: US 8,284,639 B2
(45) Date of Patent: Oct. 9, 2012

(54) INFORMATION REPRODUCING APPARATUS

(75) Inventors: Youichi Yamada, Tokorozawa (JP);
Koichiro Sakata, Tokorozawa (JP);
Tomohiko Kimura, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 12/986,419

(22) Filed: Jan. 7, 2011

(65) Prior Publication Data

US 2011/0097055 A1    Apr. 28, 2011

Related U.S. Application Data

(63) Continuation of application No. 11/660,963, filed as application No. PCT/JP2005/014726 on Aug. 11, 2005, now Pat. No. 7,889,605.

(30) Foreign Application Priority Data

Aug. 25, 2004    (JP) ................. P2004-245868

(51) Int. Cl.
*G11B 21/08* (2006.01)

(52) U.S. Cl. ................... 369/30.18; 369/4; 386/241

(58) Field of Classification Search ............... 369/30.18, 369/30.1–30.17, 30.27, 53.11, 53.31, 53.32, 369/53.2, 53.41, 47.11; 381/119; 396/230, 396/241, 242, 243, 248, 314, 343; 386/230, 386/241, 242, 243, 248, 314, 343
See application file for complete search history.

(56) References Cited

U.S. PATENT DOCUMENTS

| | | | |
|---|---|---|---|
| 4,991,159 A | 2/1991 | Tomoda et al. | |
| 5,008,875 A | 4/1991 | Tomoda et al. | |
| 5,138,600 A | 8/1992 | Aoyagi | |
| 5,231,239 A | 7/1993 | Tsumura et al. | |
| 5,386,581 A * | 1/1995 | Suzuki et al. | 715/204 |
| 5,410,524 A | 4/1995 | Takeya | |
| 5,477,516 A * | 12/1995 | Takezawa | 369/30.04 |
| 5,506,821 A | 4/1996 | Burton, Jr. | |
| 5,513,306 A * | 4/1996 | Mills et al. | 715/202 |
| 5,737,308 A | 4/1998 | Nakai et al. | |
| 5,832,173 A * | 11/1998 | Terasawa et al. | 386/343 |
| 6,101,311 A * | 8/2000 | Sakamoto | 386/241 |
| 6,259,740 B1 * | 7/2001 | Lyu | 375/240.25 |
| 6,788,634 B1 | 9/2004 | Becher et al. | |
| 6,975,568 B2 | 12/2005 | Uno | |
| 7,031,243 B2 | 4/2006 | Yamada et al. | |

(Continued)

FOREIGN PATENT DOCUMENTS

| | | |
|---|---|---|
| JP | 3-103912 | 4/1991 |
| JP | 5-90671 | 12/1993 |
| JP | 7-176175 | 7/1995 |
| JP | 8-076780 | 3/1996 |
| JP | 2000-148378 | 5/2000 |

(Continued)

*Primary Examiner* — Tan X Dinh
(74) *Attorney, Agent, or Firm* — Drinker Biddle & Reath LLP

(57) ABSTRACT

An information reproducing control apparatus, a display device, a control method, and a storage medium are disclosed, the control apparatus includes a display control device for controlling to display a reproducing point in sequential content data; an operating device including an operator, a user being able to directly touch the operator, the operator being used for designating a desired point of the content data as a new reproducing point; a specifying device for directly specifying a reproducing point corresponding to the new reproducing point. The operator having an operation area including one end portion provided along with one end portion of a display area of the elapsed time on the display device and the other end portion provided along with the other portion of the display area of the elapsed time on the display device.

10 Claims, 11 Drawing Sheets

U.S. PATENT DOCUMENTS

| | | | |
|---|---|---|---|
| 7,177,524 B2 * | 2/2007 | Tanaka | 386/287 |
| 7,577,334 B2 * | 8/2009 | Kashino et al. | 386/343 |
| 7,949,232 B2 * | 5/2011 | Toyoda et al. | 386/343 |
| 7,978,955 B2 * | 7/2011 | Iwase et al. | 386/239 |
| 2010/0185775 A1 * | 7/2010 | Lee | 709/231 |

FOREIGN PATENT DOCUMENTS

| | | |
|---|---|---|
| JP | 2002-341888 | 11/2002 |
| JP | 2002-352569 | 12/2002 |
| JP | 2004-139321 | 5/2004 |
| JP | 2004-234807 | 8/2004 |

* cited by examiner

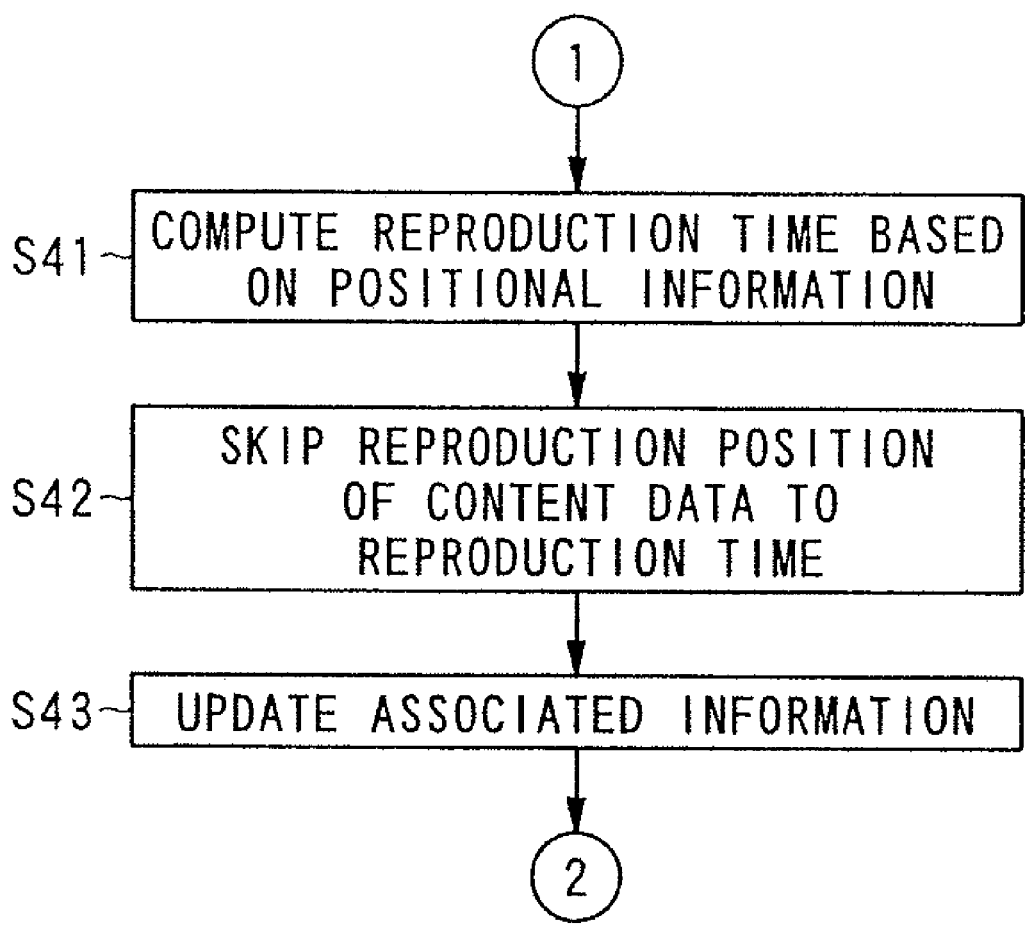

INFORMATION REPRODUCING APPARATUS

This is a continuation application of application Ser. No. 11/660,963, having a §371 date of May 6, 2008, now U.S. Pat. No. 7,889,605 which is a national stage filing based on PCT International Application No. PCT/JP2005/014726, filed on Aug. 11, 2005. The application Ser. No. 11/660,963 is incorporated by reference herein in its entirety.

TECHNICAL FIELD

The present invention relates to an information reproducing apparatus which reproduces sound information or video information recorded in a recording medium.

BACKGROUND ART

Recently, a recording medium (digital recording medium) such as CD (Compact Disc) and DVD (Digital Versatile Disc) in which data can be recorded and reproduced with digital signals becomes widespread, and an information reproducing apparatus having various reproducing functions in which an advantage of the recording with digital signals is positively utilized is brought into practical use.

Particularly, when compared with a recording medium (analog recording medium) typified by cassette tape and video tape in which the data is recorded and reproduced with analog signals, the digital recording has advantages in responsibility of reading the recorded content data and user-friendliness in searching an arbitrary reproduction position. Examples of the advantage includes "reproduction heading" in which the reproduction is performed by searching a leading end address from plural groups of pieces of data such as each song and a set of series of video scenes (hereinafter referred to as "scene"), i.e., a set of plural pieces of data in providing the data as contents to a user (hereinafter the set is referred to as content data) and "random reproduction" in which reproduction procedures of the pieces of content data are exchanged to reproduce the content data. The information reproducing apparatus having various reproducing functions becomes commercially practical.

Conventionally, in order to facilitate specification of a reproduction position in the content data such as the songs and video scenes recorded in the digital recording medium, there is known an information reproducing apparatus in which a change in amount of temporal information on the content data is analyzed to notify the user of the analysis result during the reproduction of the content data.

For example, in the information reproducing apparatus, the change in amount of temporal information on each content data is previously analyzed, and a difference between the previously-analyzed result and the change in amount of temporal information on the content data is displayed in the form of a level difference on the display means. According to the above configuration, the user can operate an operating unit based on the analysis result, so that the user can properly and easily specify the desired reproduction point (for example, see Patent Document 1).

Patent Document 1: Japanese Patent Application Laid-Open No. 2002-341888

DISCLOSURE OF THE INVENTION

However, in the conventional information reproducing apparatus, the user cannot directly and intuitively designate the desired reproduction time in the content data. That is, in the conventional information reproducing apparatus, although the user can designate the reproduction point (reproduction time) based on the visually-provided change level in amount of information amount, the user specifies the reproduction point with a conventional operator such as a forward operation key and rewind operation key for the data reproduction. Therefore, the user cannot directly and intuitively designate the desired reproduction time.

In view of the foregoing problems, an object of the invention is to provide an information reproducing apparatus which can directly and intuitively designate a reproduction point, as desired by a user, based on the change in visually-provided information amount.

Means for Solving the Problems

To solve above-mentioned problem, according to a first aspect of the present invention, there is provided an information reproducing apparatus which reproduces content data having a predetermined time length, the information reproducing apparatus comprising: acquisition means for acquiring said content data and elapsed-time information indicating elapsed time in reproducing said content data; analysis means for analyzing a change in amount of information according to the elapsed time in reproducing said content data based on said acquired content data and elapsed-time information; display control means for displaying the change in amount of information on the content data according to the elapsed time in a form of level information on display means, the change in amount of information on said content data according to the elapsed time being analyzed in the whole of said acquired content data; operation means having an operator, a user being able to directly make contact with said operator, said operator being directly moved within a predetermined operation area according to operation of the user, said operator being used in specifying start time for starting reproduction of said acquired content data from arbitrary time; and reproduction control means for causing reproduction means to perform the reproduction of said content data from the start time specified by said operator.

According to an eighth aspect of the present invention, there is provided an information reproducing apparatus which reproduces content data having a predetermined time length, the information reproducing apparatus comprising: acquisition means for acquiring said content data and time length data indicating the time length in reproducing said content data; operation means having an operator, a user being able to directly make contact with said operator, said operator being directly moved within a predetermined operation area according to operation of the user, said operator being used in specifying start time for starting reproduction of said acquired content data from arbitrary time; reproduction control means for causing reproduction time of said content data to correspond to an operation range of said operator based on said acquired time length data, said reproduction control means causing reproduction means to reproduce said content data from start time specified by said operator; movement control means for moving said operator within said operation range according to the reproduction of the content data; and detection means for detecting whether or not said user makes contact with said operator, wherein said reproduction control means causes said reproduction means to stop the reproduction of the content data, when said detection means detects that said user makes contact with said operator during the reproduction of said content data.

BRIEF DESCRIPTION OF THE DRAWINGS

FIG. 11 is a flowchart (II) showing the action of the reproducing process based on the operation of the operator in the system control unit of the second embodiment.

Figure 1:
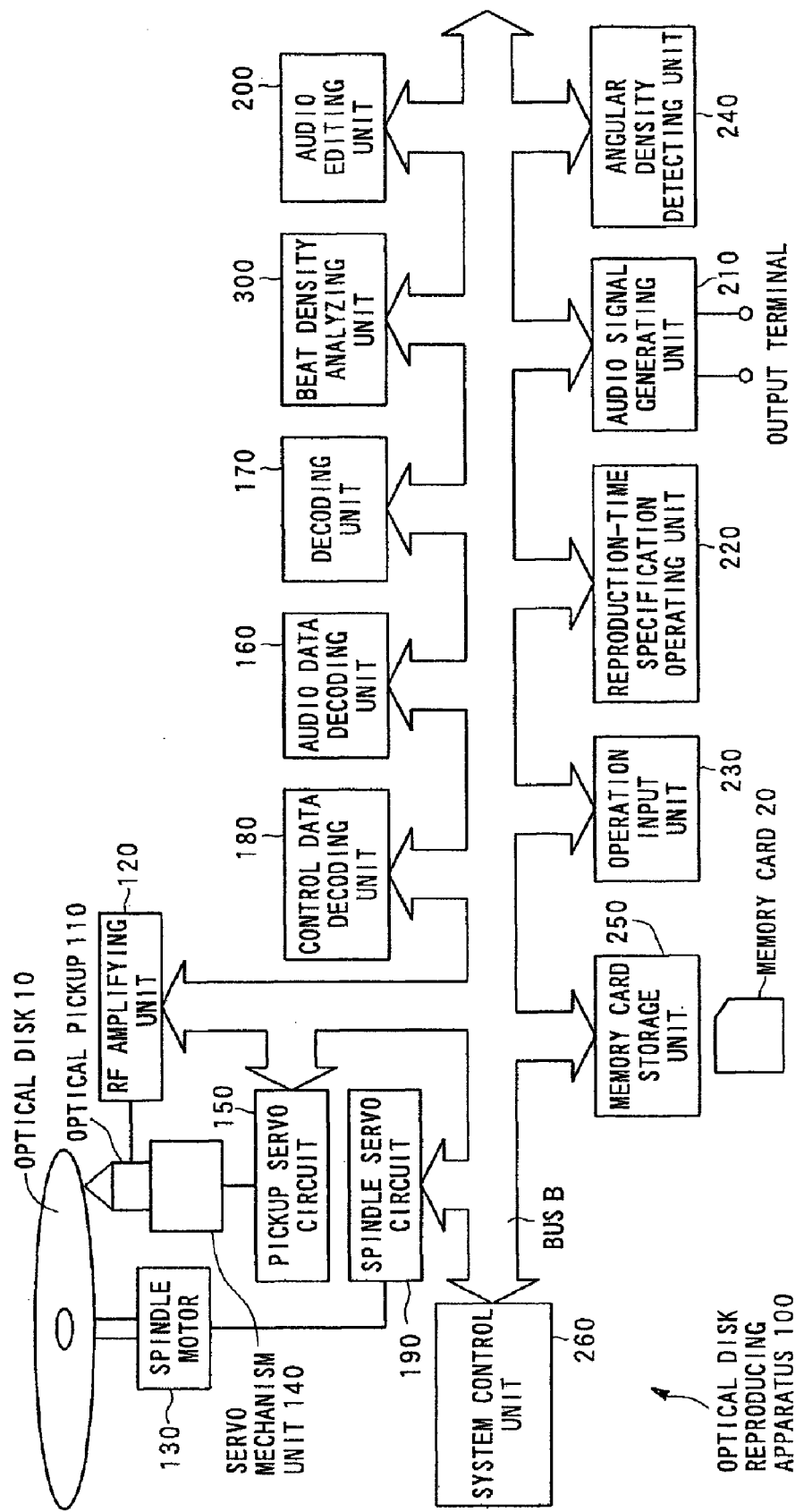
FIG. 1 is a block diagram showing a configuration of an optical disk reproducing apparatus according to a first embodiment of the invention.

EXPLANATIONS OF LETTERS AND NUMERALS 10 optical disk
20 memory card
100 optical disk reproducing apparatus
110 optical pickup
120 RF amplifying unit
130 spindle motor
140 servo mechanism unit
150 pickup servo circuit
160 audio data decoding unit
170 decoding unit
180 control data decoding unit
190 spindle servo circuit
200 audio editing unit
210 audio signal generating unit
220 and 500 reproduction-time specification operating unit
221 and 502 display unit
222 display control unit
223 movement control unit
230 operation input unit
240 angular velocity detecting unit
250 memory card storage unit
260 system control unit
300 beat density analyzing unit
501 reproduction-time specifying unit
RBM ring buffer memory
PD pack data
MF movable operator
OF operation area OF
TP position designating operator

BEST MODE FOR CARRYING OUT THE INVENTION

Preferred embodiments of the invention will be described below with reference to the accompanying drawings.

In the following embodiments, an information reproducing apparatus of the invention is applied to an optical disk reproducing apparatus (hereinafter referred to as optical disk reproducing apparatus), such as a CD player, which has various reproduction functions typically including reproduction speed, beat per minute, and rewind reproduction.

The optical disk reproducing apparatus of each embodiment is used as the reproducing apparatus which continuously reproduces music data while the optical disks are changed one after another, for example, in a ballroom such as a club and a disco. Particularly, the optical disk reproducing apparatus of each embodiment is used as a special reproducing apparatus (DJ: Disc Jockey apparatus) in which an operational personnel (also referred to as disk jockey) controls a rotating direction or rotating speed of the optical disk to perform special reproduction such as a function of reproducing the music data and a function of repeatedly reproducing a data portion of the specified music data.

First Embodiment

An optical disk reproducing apparatus according to a first embodiment which reproduces the optical disk will be described with reference to FIGS. 1 to 8.

A configuration of the optical disk reproducing apparatus of the first embodiment will be described with reference to FIG. 1. FIG. 1 is a block diagram showing the configuration of the optical disk reproducing apparatus of the first embodiment.

As shown in FIG. 1, an optical disk reproducing apparatus 100 of the first embodiment includes an optical pickup (also referred to as PU) 110, an RF amplifying unit 120, a spindle motor 130, a servo mechanism unit 140, and a pickup servo circuit 150. The optical pickup 110 reads content data and control data necessary to reproduce the content data. The control data is recorded in an optical disk 10 inserted from a disk insertion port (not shown). The RF amplifying unit 120 generates an RF signal and an error signal for servo control based on a signal (hereinafter referred to as read signal) read by the optical pickup 110. The spindle motor 130 has a hub portion (not shown) into which the optical disk 10 is loaded, and the spindle motor 130 rotates the loaded optical disk 10. The servo mechanism unit 140 performs servo control of the optical pickup 110. The pickup servo circuit 150 performs feedback control and position control of the servo mechanism based on the error signal generated by the RF amplifying unit 120. The RF amplifying unit 120 and the pickup servo circuit 150 are connected to a bus B.

The optical disk reproducing apparatus 100 of the first embodiment also includes an audio data decoding unit 160, a decoding unit 170, a control data decoding unit 180, a spindle servo circuit 190, a beat density analyzing unit 300, an audio editing unit 200, and an audio signal generating unit 210. The audio data decoding unit 160 separates and extracts an audio stream included in the RF signal. The decoding unit 170 decodes the audio data stream into audio data. The control data decoding unit 180 decodes the RF signal to separate and extract the control data included in the RF signal. The spindle servo circuit 190 performs the feedback control of the rotation of the spindle motor 130 based on the control data. The beat density analyzing unit 300 analyses a change in amount of information on a beat according to elapsed time in the entire content data when the content data is reproduced. The audio editing unit 200 performs a predetermined modulation process to the audio data to perform an effect process (editing process) of imparting various sound effects. The audio signal generating unit 210 performs a predetermined process to the audio data to which the modulation process is already performed, and the audio signal generating unit 210 outputs the audio data to an external device (not shown) through an output terminal 211. Each unit is connected to the bus B.

The optical disk reproducing apparatus 100 of the first embodiment having the above configuration performs various kinds of control to read the content data from the loaded optical disk 10. Additionally, in order to reproduce the content data read from the optical disk 10, the optical disk reproducing apparatus 100 performs predetermined processes to the various kinds of data read and outputs the various kinds of data to the external device (not shown) such as a power amplifier and a speaker.

The optical disk reproducing apparatus 100 of the first embodiment also includes a reproduction-time specification operating unit 220, an operation input unit 230, an angular velocity detecting unit 240, a memory card storage unit 250, and a system control unit 260. The reproduction-time specification operating unit 220 displays the change in amount of information on the beat according to the elapsed time in the entire content data, and the reproduction-time specification operating unit 220 is formed by a movable operator (also referred to as moving fader) MF which is used to specify a reproduction point of the optical disk 10 while being movable in an operation area OF corresponding to the display area. The operation input unit 230 includes plural operation keys and a jog dial, and is used to provide a general reproduction command. The angular velocity detecting unit 240 optically detects the rotating direction and rotating speed (angular velocity) of the jog dial in the operation unit. The memory card storage unit 250 is configured such that a memory card 20 is detachably inserted therein, and the memory card storage unit 250 reads the data stored in the memory card 20. The system control unit 260 controls each unit wholly. Each unit is connected to the bus B.

The optical disk reproducing apparatus 100 of the first embodiment having the above configuration reproduces the content data recorded in the loaded optical disk 10 while performing the process of each unit based on operation of a user.

The control data decoding unit 180 and audio data decoding unit 160 of the first embodiment constitute the acquisition means of the invention, and the beat density analyzing unit 300 of the first embodiment constitutes the analysis means and reproduction means of the invention. The reproduction-time specification operating unit 220 of the first embodiment constitutes the operation means, display means, display control means, specifying means, movement control means, and detection means of the invention. The system control unit 260 of the first embodiment constitutes the reproduction control means of the invention.

The optical pickup 110 has a semiconductor laser which reads the content data and control data from the loaded optical disk 10 and irradiates a data recording layer with a laser beam. The content data is recorded in the data recording layer of the optical disk 10. The optical pickup 110 irradiates the data recording layer with the laser beam and receives the light reflected from the data recording layer, and the optical pickup 110 outputs the received light in the form of the read signal to the RF amplifying unit 120.

The read signal is inputted to the RF amplifying unit 120 from the optical pickup 110. The RF amplifying unit 120 generates the RF signal based on the input read signal, i.e., based on the data recorded in the optical disk 10, and the RF amplifying unit 120 outputs the generated RF signal to the audio data decoding unit 160 and the control data decoding unit 180.

The RF amplifying unit 120 generates the error signal based on the input read signal. The error signal includes a signal (hereinafter referred to as focus error signal) for controlling focus when the optical pickup 110 irradiates the optical disk 10 with the laser beam and a signal (hereinafter referred to as tracking error signal) for controlling tracking when the optical pickup 110 irradiates the optical disk 10 with the laser beam. The RF amplifying unit 120 outputs each generated error signal to the pickup servo circuit 150.

The spindle motor 130 is provided on a drive shaft of the spindle motor 130, and the spindle motor 130 has the hub portion (not shown) in which the optical disk 10 is loaded. The spindle motor 130 rotates the optical disk 10 based on the control of the spindle servo circuit 190.

The servo mechanism unit 140 is coupled to the optical pickup 110 and causes the optical pickup 110 to travel in a radial direction of the loaded optical disk 10. The servo mechanism unit 140 performs servo control to the optical pickup 110 such that the optical pickup 110 appropriately reads the light reflected from the optical disk 10.

Each error signal generated by the RF amplifying unit 120 is inputted to the pickup servo circuit 150, and the pickup servo circuit 150 performs the feedback control to the servo mechanism based on each inputted error signal in order to suppress the generation of the focus error, the tracking error or the like.

The pickup servo circuit 150 controls the position of the servo mechanism under the control of the system control unit 260 such that irradiation position of the laser beam emitted from the optical pickup 110 is moved to the recording layer of the optical disk 10, specifically, to a recording track provided in the recording layer.

The RF signal generated by the RF amplifying unit 120 is inputted to the audio data decoding unit 160. The audio data decoding unit 160 decodes the RF signal in conformity with a format standardized in each optical disk 10 to separate and extract the audio stream included in the RF signal. In the audio stream, information is compressed in conformity with the standard such as MPEG (Motion Picture Experts Group), AC-3 (Audio Code number 3), and MP3 (MPEG Audio Layer-3). The audio data decoding unit 160 outputs the extracted audio stream to the decoding unit 170.

The audio stream is inputted to the decoding unit 170 from the audio data decoding unit 160. The decoding unit 170 decodes the input audio stream into the audio data, and the decoding unit 170 outputs the decoded audio data in the form of the reproduction data to the beat density analyzing unit 300.

In the following description, in the first embodiment, the audio data decoded by the decoding unit is referred to as reproduction data, and the reproduction data is used as expression different from the content data which is of a set of pieces of the reproduction data.

The RF signal generated by the RF amplifying unit 120 is inputted to the control data decoding unit 180. The control data decoding unit 180 decodes the input RF signal in conformity with a format standardized in each optical disk 10, and the control data decoding unit 180 separates and extracts the control data included in the RF signal. The control data decoding unit 180 outputs the separated and extracted control data to the beat density analyzing unit 300, the spindle servo circuit 190, and the reproduction-time specification operating unit 220.

Specifically, the control data decoding unit 180 separates and extracts the control data including TOC (Table of Contents) data and various kinds of control data. The TOC data is recorded in an area (hereinafter referred to as read-in area) in which the control data in the data recorded in the optical disk 10 is recorded. Examples of the various kinds of control data include synchronous data recorded in the audio stream and sub-code data including elapsed-time information for indicating elapsed time in reproducing the content data. The control data decoding unit 180 outputs the sub-code data to the beat density analyzing unit 300 and outputs the synchronous data to the spindle servo circuit 190 and all the pieces of control data to the system control unit 260.

The sub-code data extracted by the control data decoding unit 180 includes sub-code for indicating the elapsed time in reproducing the content data and the later-mentioned Q sub-code (hereinafter also referred to as elapsed-time information).

The control data is outputted to the spindle servo circuit 190 from the control data decoding unit 180. Specifically, the synchronous data (hereinafter referred to as detected synchronous data) and the synchronous data (hereinafter referred to as control synchronous data) are inputted to the spindle servo circuit 190. The control synchronous data is used for the rotating speed of the spindle motor 130, and the rotating speed is directed by the system control unit 260. The spindle servo circuit 190 detects an error between the detected synchronous data and the control synchronous data, and the spindle servo circuit 190 performs the feedback control of the rotation of the spindle motor 130 to suppress the generation of the detected error.

The sub-code data is inputted to the beat density analyzing unit 300 from the control data decoding unit 180, and the reproduction data which is of the audio data is outputted to the beat density analyzing unit 300 from the decoding unit 170. The beat density analyzing unit 300 analyzes the change in amount of information on the beat according to the elapsed time in the entire content data based on the inputted sub-code data and reproduction data. The beat density analyzing unit 300 outputs the analyzed change in amount of information on the beat to the reproduction-time specification operating unit 220 through the system control unit 260, and the beat density analyzing unit 300 outputs the pack data PD, generated in analyzing the change in amount of information on the beat, to the audio editing unit 200.

Specifically, the beat density analyzing unit 300 has a ring buffer memory RBM in which the stored data is held in an endless manner and generates the pack data which is formed by a predetermined data structure. In the pack data PD, the input sub-code data and the reproduction data corresponding to the sub-code data are associated with each other. The beat density analyzing unit 300 stores the generated pack data PD in the ring buffer memory RBM. The beat density analyzing unit 300 performs a batch process which is of a series of predetermined processes and sequentially outputs the reproduction data, included in the pack data PD, to the audio editing unit 200 based on the control of the system control unit 260.

The beat density analyzing unit 300 performs the batch process, which allows the process of the audio editing unit 200 to be substantially delinked from the process of reproducing the reproduction data and control data from the optical disk 10.

On the other hand, the beat density analyzing unit 300 generates the change in amount of information on the beat according to the elapsed time, i.e., data (hereinafter referred to as bit density data) of the amount of information on the beat according to elapsed time in the entire content data, called bit density, from the generated pack data PD in each one piece of content data. The beat density analyzing unit 300 outputs the generated bit density data to the reproduction-time specification operating unit 220.

Because the bit density data is one which indicates beat density of the entire content data to be reproduced, the beat density analyzing unit 300 generates the data including a time length of the entire content data, and the time length is used in the reproduction-time specification operating unit 220 as described later.

A configuration and action of the beat density analyzing unit 300 of the first embodiment will be described in detail later.

The reproduction data is inputted to the audio editing unit 200 from the beat density analyzing unit 300. The audio editing unit 200 performs the effect process (editing process) of imparting various sound effects by performing a predetermined modulation process such as a process of modulating the inputted reproduction data with a sawtooth wave. The audio editing unit 200 output the data (hereinafter referred to as effect data), to which the effect process is already performed, to the audio signal generating unit 210.

The effect data to which the effect process is already performed is inputted to the audio signal generating unit 210. The audio signal generating unit 210 maintains the digital signal format of the inputted effect data or causes an A/D converter (not shown) to convert the effect data into an analog audio signal having an audible frequency band. The audio signal generating unit 210 outputs the data whose signal format is maintained or the data whose signal format is converted to the external device such as the power amplifier and the speaker through the output terminal 211.

The beat density data in the entire content data to be reproduced, which is of the output from the beat density analyzing unit 300, and the later-mentioned track elapsed-time data for indicating the currently-reproduced reproduction position during the reproduction of the content data are inputted to the reproduction-time specification operating unit 220.

The reproduction-time specification operating unit 220 has a display unit 221 including a liquid crystal display device and displays the beat density data of the entire content data on the display unit 221 based on the inputted beat density data. The reproduction-time specification operating unit 220 also has the movable operator MF which is provided along with the display unit 221 to move a predetermined operation area OF. The reproduction-time specification operating unit 220 sets a movable range of the movable operator MF within the operation area OF based on the inputted beat density data and moves the movable operator MF based on the inputted track elapsed-time data such that the center of the movable operator MF specifies the beat density data at time reproduced in the display unit 221 during the reproduction of the content data.

In the reproduction-time specification operating unit 220 of the first embodiment, the pieces of data concerning the content data such as the TOC data are also displayed on the display unit 221 in addition to the beat density data. The TOC data and the like necessary for the display are displayed based on the sub-code data which is of the output from the control data decoding unit 180.

On the other hand, the reproduction-time specification operating unit 220 detects whether or not a user makes contact with the movable operator MF. When the reproduction-time specification operating unit 220 detects that the user makes contact with the movable operator MF during the reproduction of the content data, the reproduction-time specification operating unit 220 notifies the user contact of the system control unit 260 to stop the reproduction of the content data.

The reproduction-time specification operating unit 220 moves the movable operator MF within the operation area OF when the reproduction of the content data is stopped. When the reproduction-time specification operating unit 220 detects that the user does not make contact with the movable operator MF, the reproduction-time specification operating unit 220 computes reproduction start time of the content data corresponding to any point of the operation area OF which is specified by the movement of the movable operator MF, and the reproduction-time specification operating unit 220 outputs the computed reproduction start time in the form of the reproduction time data to the system control unit 260.

When the reproduction time data for indicating the reproduction start time of the content data is inputted to the system control unit 260, the system control unit 260 controls the beat density analyzing unit 300, the audio editing unit 200, and the audio signal generating unit 210 to reproduce the content data at the reproduction time.

A configuration and action of the reproduction-time specification operating unit 220 of the first embodiment will be described later.

The operation input unit 230 includes various confirmation buttons, a push-pull first operation key, a jog dial, plural second operation keys, and plural third operation keys. The first operation key is used to input various operation commands. The jog dial is formed in a disc shape which is rotatable in both directions, and the jog dial is used to provide a command for the reproducing action of the content data. The second operation key includes a rotary switch which is rotatable in both directions or a rotary variable resistor. The third operation key includes a slide type variable resistor.

The operation input unit 230 outputs a signal for directing further various edits with each of the first operation key and jog dial and a signal for directing a forward reproducing process of sequentially reproducing the content data in the forward direction, a reverse reproducing process of sequentially reproducing the content data in the reverse order of the forward direction, or the like to the system control unit 260.

As with the first operation key, each of the second and third operation keys is used to output the signal for performing the edit (effect) in the disk reproducing unit to the audio editing unit 200.

The angular velocity detecting unit 240 has a rotary encoder circuit to optically detect the rotating direction and rotating speed (angular velocity) of the jog dial in the operation input unit 230 and outputs the detected data in the form of the detection data to the system control unit 260.

The memory card storage unit 250 has a slot through which the memory card 20 having a predetermined format is detachably attached. Under the control of the system control unit 260, the memory card storage unit 250 reads predetermined data from the attached memory card 20 and outputs the read data to the beat density analyzing unit 300 through the system control unit 260.

Specifically, on the basis of the control of the system control unit 260, the memory card storage unit 250 reads the bit density data and the pack data PD from the memory card 20 and outputs the read bit density data to the reproduction-time specification operating unit 220 while outputting the read pack data PD to the beat density analyzing unit 300. The bit density data and the pack data PD are data indicating the change in amount of previously-stored information on the analyzed beat and the time length of the content data.

In the first embodiment, using the bit density data and pack data PD previously stored in the memory card 20, the display of the bit density data and other processes can be performed without reading various pieces of data from the loaded optical disk 10.

The memory card 20 may be configured such that only the bit density data is stored. In this case, the special reproductions are performed along with the pack data PD read from the loaded optical disk 10 described above.

The system control unit 260 mainly includes a central processing unit (CPU), ROM/RAM, and various input and output ports such as key input port and control port. Various pieces of data are read from and written in ROM/RAM when a predetermined process is performed. The system control unit 260 controls the whole functions of the optical disk reproducing apparatus 100. The system control unit 260 reads a control program, and the system control unit 260 performs various processes based on the read control program while the data being processed is temporarily stored in ROM/RAM.

Particularly, in the first embodiment, when the command for reproducing the content data is inputted based on the operation of the operation input unit 230, the system control unit 260 reads the pack data PD stored in the ring buffer memory RBM and causes the audio signal generating unit 210 to decode the pack data PD to output the decoded pack data PD to the external device. At this point, the system control unit 260 controls the movement control unit 223 according to the elapsed time associated with the reproduction of the content data and sequentially slides and moves the movable operator MF to the position for indicating the reproduction time of the content data being reproduced such that the action of the movable operator MF is controlled.

The system control unit 260 controls the start and stop of the reproduction of the reproduction data depending on the contact or non-contact of the user with the movable operator MF, which is detected by the reproduction-time specification operating unit 220. When the reproduction-time specification operating unit 220 detects that the user makes contact with the movable operator MF during the reproduction of the content data, the system control unit 260 controls the beat density analyzing unit 300, the audio editing unit 200, and the audio signal generating unit 210 to stop the content data being reproduced.

On the other hand, when the reproduction of the optical disk 10 is stopped, the system control unit 260 controls the beat density analyzing unit 300 such that the any reproduction start time is specified by the operation of the movable operator MF of the reproduction-time specification operating unit 220. When the reproduction-time specification operating unit 220 detects that the user does not make contact with the movable operator MF, and the system control unit 260 controls the beat density analyzing unit 300 controls the beat density analyzing unit 300 such that the content data is reproduced from the specified reproduction time. Therefore, the system control unit 260 reads the relevant pack data PD stored in the ring buffer memory RBM. The system control unit 260 controls the audio editing unit 200 and the audio signal generating unit 210 so as to reproduce the reproduction data in the read pack data PD.

The process of stopping the reproduction of the content data in the system control unit 260 based on the contact or non-contact of the user with the movable operator MF and the process of reproducing the content data by the operation of the movable operator MF (hereinafter referred to as reproducing process based on operation of operator) will be described in detail later.

Because it is assumed that the entire content data cannot completely be stored in the ring buffer memory RBM, the system control unit 260 detects an excess of a recording capacity of the ring buffer memory RBM based on an operation amount of the jog dial or the reproduction time of the movable operator MF when the movable operator MF of the reproduction-time specification operating unit 220 is operated. When each operation amount exceeds the recording capacity of the ring buffer memory RBM, in order to update the pack data PD currently stored in the ring buffer memory RBM to the another pack data PD, the system control unit 260 controls the pickup servo circuit 150 and spindle servo circuit 190 to move the optical pickup 110 to read the data from the optical disk 10.

A configuration and action of the beat density analyzing unit 300 of the first embodiment will be described below with reference to FIGS. 2 to 5.

Figure 2:
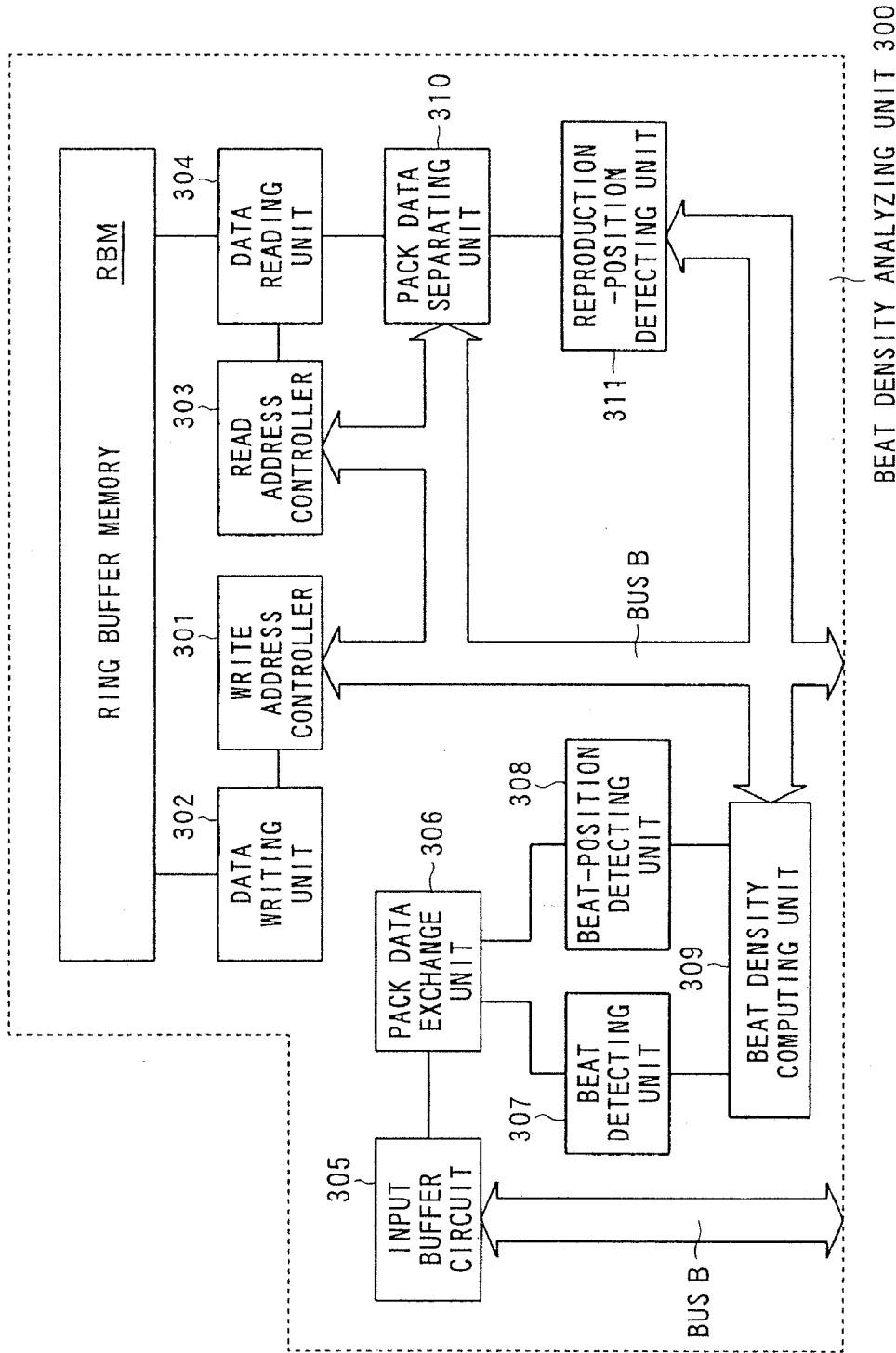
FIG. 2 is a block diagram showing a configuration of a beat density analyzing unit of the first embodiment.
Figure 3:
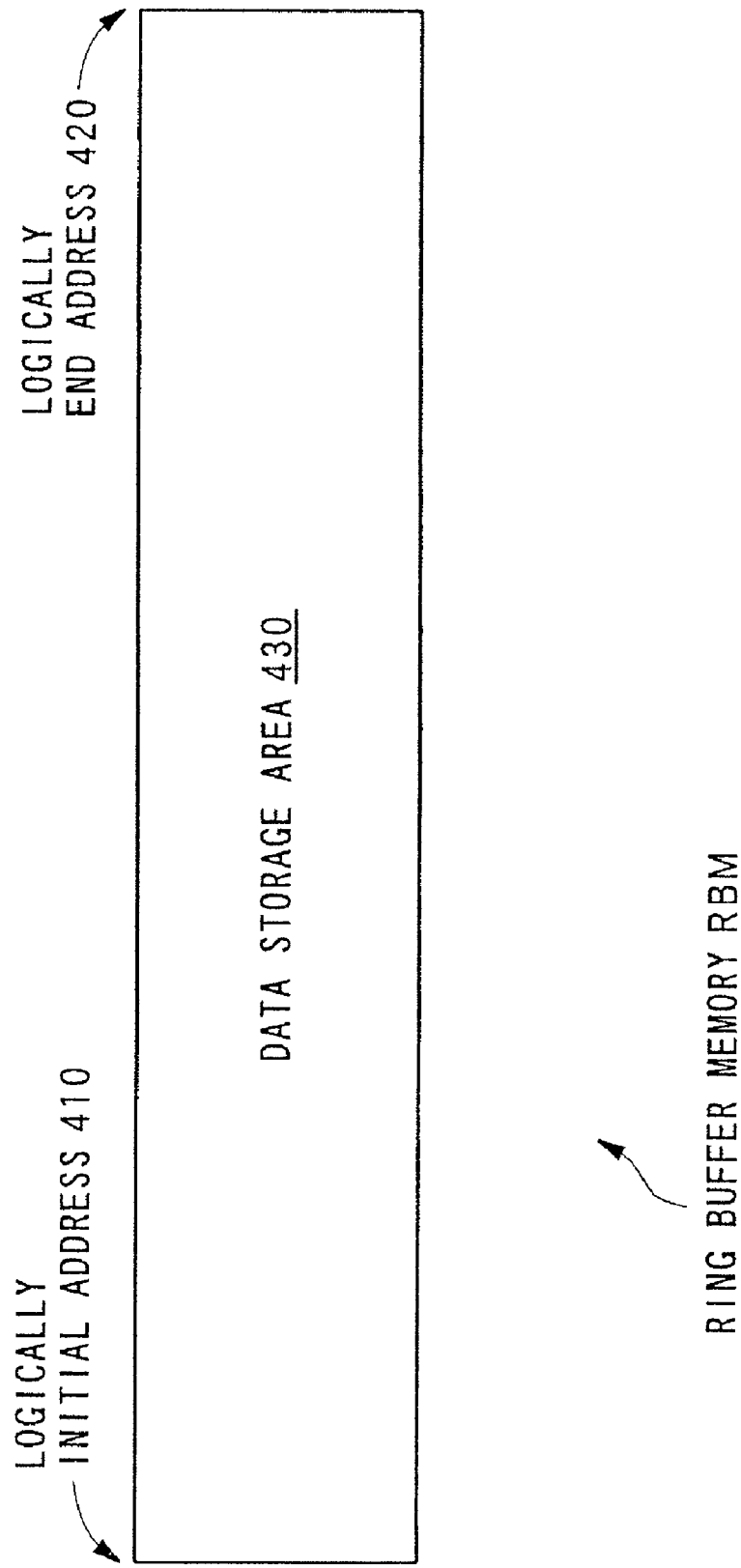
FIG. 3 is an example of a logical structure view showing a part of a logical structure in a ring buffer memory of the first embodiment.
Figure 4:
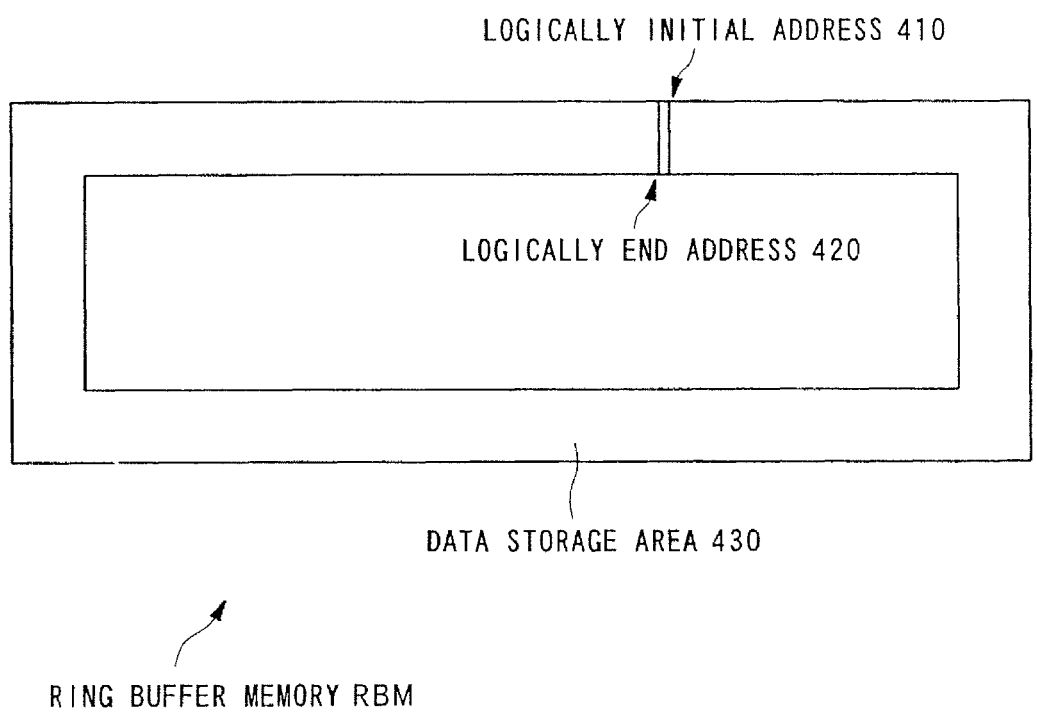
FIG. 4 is an example of a logical structure view showing an entire logical structure in the ring buffer memory of the first embodiment.
Figure 5:
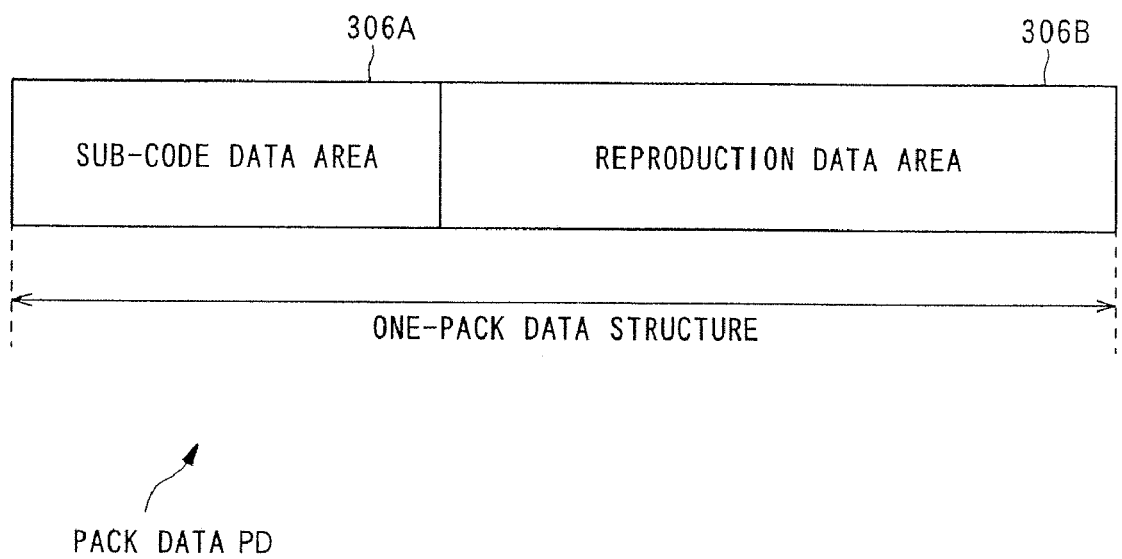
FIG. 5 is an example of a logical structure view showing a logical structure of pack data generated in a pack data exchange unit of the first embodiment.

FIG. 2 is a block diagram showing the configuration of the beat density analyzing unit 300 of the first embodiment, FIG. 3 is an example of a logical structure view showing a part of a logical structure in the ring buffer memory RBM of the first embodiment, FIG. 4 is an example of a logical structure view showing an entire logical structure in the ring buffer memory RBM of the first embodiment, and FIG. 5 is an example of a logical structure view showing a logical structure of the pack data PD generated in a pack data exchange unit 306 of the first embodiment.

As described above, the beat density analyzing unit 300 of the first embodiment generates the pack data PD having the predetermined data structure by correlating the inputted sub-code data and the reproduction data, and the beat density analyzing unit 300 generates the bit density data from the generated pack data PD while storing the generated pack data PD in the ring buffer memory RBM.

As shown in FIG. 2, the beat density analyzing unit 300 includes the ring buffer memory RBM, a write address controller 301, a data writing unit 302, a read address controller 303, and a data reading unit 304. The ring buffer memory RBM having a predetermined storage capacity is formed by a non-volatile semiconductor memory. The write address controller 301 sets a write address designated by the system control unit 260. The data writing unit 302 writes the pack data PD in the write address of the ring buffer memory RBM, which is set by the write address controller 301. The read address controller 303 sets a read address designated by the system control unit 260. The data reading unit 304 reads the pack data PD from the read address of the ring buffer memory RBM, which is set by the read address controller 303. Thus, the write and read of the pack data PD are performed in the ring buffer memory RBM.

The beat density analyzing unit 300 includes an input buffer circuit 305, a pack data exchange unit 306, a beat detecting unit 307, a beat-position detecting unit 308, and a beat density computing unit 309. The input buffer circuit 305 is used when the sub-code data and the reproduction data are inputted. The pack data exchange unit 306 generates the pack data PD in which the reproduction data corresponds to the sub-code data and the reproduction data corresponding to the sub-code data are associated with each other. The beat detecting unit 307 computes count data for indicating a peak level generation frequency in each audible frequency band previously set to the reproduction data in the generated pack data PD. During the reproduction, the beat-position detecting unit 308 detects the track elapsed-time in the form of beat position data from the Q sub-code included in the sub-code data. The beat density computing unit 309 computes the beat density data by a predetermined computing process while determining the track elapsed-time in generating each piece of count data in each audible frequency band. From the generated pack data PD, the beat density analyzing unit 300 generates the bit density data for indicating the change in amount of information on the beat according to the elapsed time.

The beat density analyzing unit 300 also includes a pack data separating unit 310 and a reproduction-position detecting unit 311. The pack data separating unit 310 separates the sub-code data and the reproduction data, which are included in the pack data PD read from the ring buffer memory RBM. The reproduction-position detecting unit 311 detects the track elapsed-time at the time (present time) when the reproduction data is reproduced and amplified based on the separated sub-code data. The beat density analyzing unit 300 detects the reproduction position in reproducing the content data in order to cause the beat density according to the elapsed time of the content data to the movement of the movable operator MF of the reproduction-time specification operating unit 220.

The pack data PD is stored in the ring buffer memory RBM based on the control of the write address controller 301 and data writing unit 302, and the ring buffer memory RBM outputs the temporarily-stored pack data PD based on the read address controller 303 and data reading unit 304.

In the ring buffer memory RBM, the data is written or read while the write timing and read timing of the pack data PD are shifted from each other, which allows the batch process to be performed.

For example, in the case where the ring buffer memory RBM of the first embodiment is formed by 64-Mbyte SDRAM, as shown in FIG. 3, n pieces of pack data PD are stored in a data storage area (also referred to as main storage area) 430 from a logically initial address 410 to a logically end address 420 in the ring buffer memory RBM respectively. As shown in FIG. 4, the ring buffer memory RBM has a logical structure in which the logically initial address 410 and the logically end address 420 are arranged adjacent to each other.

The write address controller 301, the data writing unit 302, the read address controller 303, and the data reading unit 304 performs the storage and read of the pack data PD while maintaining the logical structure. That is, each of the address controller, the data writing unit 302, and the data reading unit 304 treat the data stored in the ring buffer memory RBM as endless data in which the logically initial address 410 and the logically end address 420 are connected to each other, and the pack data PD in which the address is relatively set on the condition that the logical structure shown in FIGS. 3 and 4 is maintained is stored in the ring buffer memory RBM. However, the pack data PD is not stored in a general-purpose area 470, and the general-purpose area 470 functions as a buffer area.

The sub-code data which is of the output from the control data decoding unit 180 and the reproduction data which is of the output from the decoding unit 170 are inputted to the input buffer circuit 305 through the bus B. The input buffer circuit 305 outputs the sub-code data and the reproduction data to the pack data exchange unit 306 at predetermined timing according to the instruction inputted from the system control unit 260.

The sub-code data and the reproduction data which are of the outputs from the input buffer circuit 305 are inputted at predetermined timing from the pack data exchange unit 306. The pack data exchange unit 306 generates the pack data PD in which the inputted sub-code data is associated with the reproduction data corresponding to the sub-code data.

Particularly, the pack data exchange unit 306 detects the Q sub-code from the sub-code data. The Q sub-code is a sub-code which indicates the track elapsed-time of the inputted reproduction data. Then, the pack data exchange unit 306 performs data exchange for generating the pack data PD by correlating the reproduction data corresponding to the detected Q sub-code with the sub-code data from which the Q sub-code is extracted.

For example, as shown in FIG. 5, the pack data exchange unit 306 of the first embodiment generates the pack data PD having a sub-code data area 306A and a reproduction data area 306B. The inputted sub-code data is stored in the sub-code data area 306A, and the reproduction data corresponding to the sub-code data is stored in the reproduction data area 306B. Thus, in generating the pack data PD, the pack data exchange unit 306 generates the pack data PD while the sub-code data is associated with the reproduction data corresponding to the sub-code data.

As described above, the pack data exchange unit 306 sequentially generates the pack data and stores the generated pack data PD in the ring buffer memory RBM through the data writing unit 302.

On the other hand, the pack data exchange unit 306 outputs the sub-code data in the generated pack data PD to the beat-position detecting unit 308 while outputting the reproduction data in the pack data PD to the beat detecting unit 307.

The reproduction data generated by the pack data exchange unit 306 is inputted to the beat detecting unit 307. The beat detecting unit 307 detects the peak level of the inputted reproduction data within the audible frequency band in each predetermined audible frequency band, and the beat detecting unit 307 computes a count value for indicating generation frequency of a component having a peak level in each audible frequency band. The beat detecting unit 307 outputs the count value in the form of the count data to the beat density computing unit 309 in each computed audible frequency band.

For example, the beat detecting unit 307 divides the audible frequency band into three audible frequency bands, i.e., into high, middle, and low audible frequency bands with respect to the inputted reproduction data, detects the peak levels of the divided frequency components respectively, and compares a threshold data previously set in each audible frequency band and the peak level of each audible frequency band. As a result of the comparison of the threshold data and the peak level, the beat detecting unit 307 computes the count value for indicating the generation frequency of the portion where the peak level exceeds the threshold during a predetermined interval in each frequency component, and the beat detecting unit 307 outputs the computed count value in the form of the count data to the beat density computing unit 309.

The user can operate the operating unit to perform the adjustment of each divided audible frequency band and the adjustment of the interval during which the count data is computed.

The sub-code data generated by the pack data exchange unit 306 is inputted to the beat-position detecting unit 308. The beat-position detecting unit 308 detects the track elapsed-time in the reproduction from the Q sub-code included in the sub-code data and outputs the detected track elapsed-time in the form of the beat position data to the beat density computing unit 309.

The beat position data which is of the output from the beat-position detecting unit 308 and the count data of each audible frequency band which is of the output from the beat detecting unit 307 are inputted to the beat density computing unit 309. The beat density computing unit 309 recognizes the track elapsed-time based on the inputted beat position data when each piece of count data is generated in each audible frequency band. The beat density computing unit 309 performs a predetermined computing process to compute the beat density data in the entire content data to be reproduced based on the recognized track elapsed-time and each count data at that time. The beat density computing unit 309 outputs the computed beat density data to the reproduction-time specification operating unit 220.

For example, when the audible frequency band is divided into three audible frequency bands, i.e., the high (H), middle (M), and low (L) audible frequency bands by the beat detecting unit 307, the beat density computing unit 309 computes the beat density of each track elapsed-time by performing the computation expressed by Formula 1. In the first embodiment, the later-mentioned beat density is obtained for the track elapsed-time by performing the above computation.

$$DBT=(\beta L \times DfL)+(\beta M \times DfM)+(\beta H \times DfH) \qquad (1)$$

Where DBT indicates beat density of each track elapsed-time and Df indicates count data of each audible frequency band. Coefficients $\beta L$, $\beta m$, and $\beta H$ are set to values in which the feature of the beat density can well be extracted in each music category such as rock, jazz, pops, and Latin, and the coefficients $\beta L$, $\beta M$, and $\beta H$ are experimentally obtained.

The user can operate the operating unit to set the coefficients $\beta L$, $\beta M$, and $\beta H$ to arbitrary values in each music category or independently of the music category.

The beat density data in the entire content data to be reproduced, which is computed by the beat density computing unit 309, has the data for indicating the time length of the content data, and the beat density computing unit 309 outputs the beat density data including the data having the time length to the reproduction-time specification operating unit 220.

The pack data PD read from the ring buffer memory RBM by the data reading unit 304 is inputted to the pack data separating unit 310. The pack data separating unit 310 separates the sub-code data and the reproduction data, which are included in the inputted pack data PD. The pack data separating unit 310 outputs the separated sub-code data to the reproduction-position detecting unit 311 while outputting the separated reproduction data as the reproduction data for generating reproduction sound to the audio editing unit 200.

The sub-code data which is of the output from the pack data separating unit 310 is inputted to the reproduction-position detecting unit 311. The reproduction-position detecting unit 311 extracts the Q sub-code from the inputted sub-code data. On the basis of the extracted Q sub-code, the reproduction-position detecting unit 311 detects the track elapsed-time data at the time (present time) when the reproduction data is processed by the audio editing unit 200 and audio signal generating unit 210 and finally reproduced as the reproduction sound by the speaker or a headphone. The reproduction-position detecting unit 311 outputs the detected track elapsed-time data to the reproduction-time specification operating unit 220.

The reproduction-time specification operating unit 220 moves the movable operator MF to the position of the track elapsed-time at the present time according to the beat density data which is displayed based on the track elapsed-time data.

Figure 6:
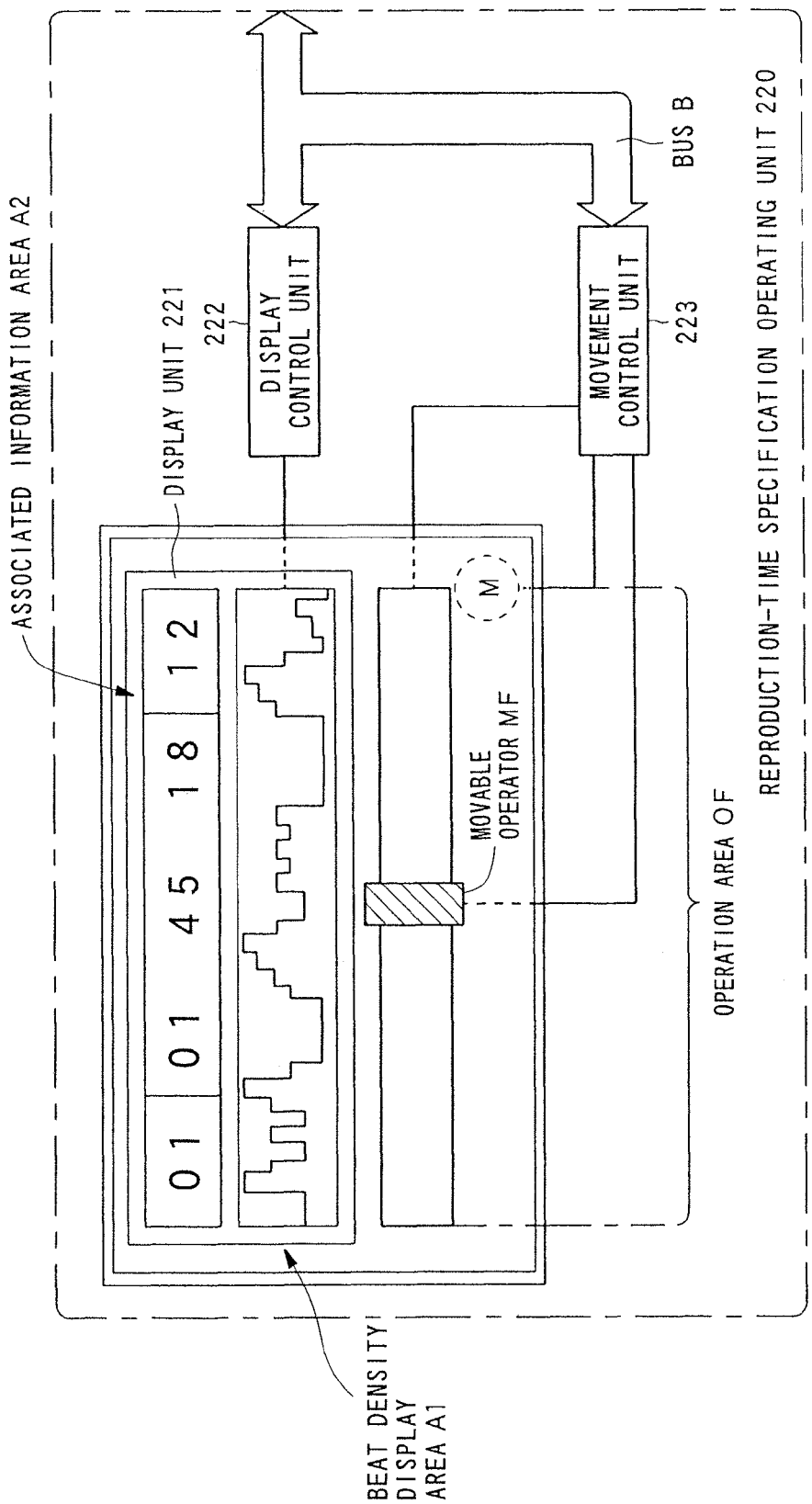
FIG. 6 is a block diagram showing a configuration of a reproduction-time specification operating unit of the first embodiment.

Then, a configuration and action of the reproduction-time specification operating unit 220 of the first embodiment will be described with reference to FIG. 6. FIG. 6 is a block diagram showing the configuration of the reproduction-time specification operating unit 220 of the first embodiment.

As described above, the reproduction-time specification operating unit 220 displays the beat density data of the entire content data which is reproduced based on the inputted beat density data and track elapsed-time data, and the reproduction-time specification operating unit 220 sets the reproduction time in the movable region of the movable operator MF within the operation area OF. During the reproduction of the content data, the reproduction-time specification operating unit 220 moves the movable operator MF such that the center of the movable operator MF corresponds to the reproduction time of the content data in the beat density data, which is displayed on the display unit 221.

The reproduction-time specification operating unit 220 detects whether or not the user makes contact with the movable operator MF, when the content data is reproduced, or when the reproduction of the content data is stopped. The reproduction-time specification operating unit 220 provides the instruction for stopping the reproduction of the content data and the instruction of the time when the reproduction of the content data is started to the system control unit 260 based on whether or not the user makes contact with the movable operator MF.

Specifically, as shown in FIG. 6, the reproduction-time specification operating unit 220 has the display unit 221, a display control unit 222, and a movement control unit 223. The display unit 221 has a beat density display area A1 where the beat density data of the entire content data is displayed, and the display unit 221 displays various pieces of data during the reproduction of the content data including the beat density data. The display control unit 222 performs display control when the beat density data is displayed on the display unit 221. The movement control unit 223 causes the movable operator MF and the time length of the entire content data to correspond to the operation area OF, and the movement control unit 223 slides and moves the movable operator MF according to the time of the reproduced content data while associated with the beat density data during the reproduction of the content data. The movable operator MF is arranged in parallel with the density display area A1 in which the beat density data is displayed on the display unit 221, and the movable operator MF is used to specify the start time for starting the reproduction of the content data from arbitrary time.

The display unit 221 of the first embodiment constitutes the display means of the invention, and the display control unit 222 constitutes the display control means of the invention. The movable operator MF of the first embodiment constitutes the operator of the invention, and the movement control unit 223 constitutes the specifying means, movement control means, and detection means of the invention.

The display unit 221 has plural display areas formed by a liquid crystal display device, and the density display area A1 and an associated information display area A2 are provided in the display unit 221. The beat density data is displayed in the beat density display area A1. A track number of the content data being reproduced, extracted from the TOC data which is of the output from the system control unit 260, and the number of tracks recorded in the optical disk are displayed in the associated information display area A2.

In the first embodiment, as shown in FIG. 6, the beat density data is displayed in the beat density display area A1. In FIG. 6, the track elapsed-time is set to a horizontal axis of the content data having a predetermined time length while the beat density is set to a vertical axis, and the individual beat density is vertically displayed in a bar graph shape in each track elapsed-time.

For example, when the music data recorded in the music CD is reproduced, in the first embodiment, the beat density analyzing unit 300 computes the beat density of one song, and all the beat densities of the one song are displayed in the beat density display area A1 while associated with the track elapsed-time.

The track number in which the music being reproduced is recorded, the digital numerical value of the track elapsed-time at the present time, and the total number of tracks indicating the total number of songs recorded in the optical disk 10 are displayed in the associated information display area A2. The user can easily understand contents of the optical disk 10 by seeing the displays of the beat density display area A1 and associated information display area A2. In the first embodiment, the track elapsed-time can be displayed up to a unit of frame.

The beat density data of the entire content data which is of the output from the beat density analyzing unit 300 and the control data which is of the output from the control data decoding unit 180 are inputted to the display control unit 222. The content data indicates the change in amount of information on the beat according to the elapsed time. The display control unit 222 displays the inputted beat density data on the display unit 221 while associated with the track elapsed-time, and the display control unit 222 displays various pieces of data shown by the control data on the display unit 221.

For example, the display control unit 222 generates image data for displaying the beat density of the entire content data while the inputted beat density data is associated with the track elapsed-time, and the display control unit 222 displays the generated image data in the beat density display area A1. The display control unit 222 generates the image data for displaying the various pieces of information based on the control data such as the inputted TOC data, and the display control unit 222 displays the generated image data in the associated information display area A2.

The movable operator MF is provided adjacent to the beat density display area A1 while being movable in the predetermined operation area OF, and the movable operator MF is moved according to the beat density data displayed on the display unit 221. The movable operator MF is movable within the operation area OF which has one end portion provided along with one end portion of the beat density display area A1 and the other end portion provided along with the other end portion of the beat density display area A1.

On the other hand, during the reproduction of the content data, the movable operator MF is slid and moved within the operation area OF based on the control of the movement control unit 223 such that the center of the movable operator MF indicates the track elapsed-time in the beat density display area A1 when the external device (not shown) such as the speaker and the headphone outputs the reproduction sound.

The beat density data of the entire content data is inputted to the movement control unit 223. The movement control unit 223 moves the movable operator MF according to the beat density data displayed on the display unit 221, so that the movement control unit 223 can cause the operation area OF to correspond to the time length of the content data shown by the beat density data.

The movement control unit 223 moves the movable operator MF within the operation area OF according to the reproduction of the content data. When the user slides the movable operator MF, the movement control unit 223 computes a movement amount of the movable operator MF in the operation area OF, and the movement control unit 223 also computes the reproduction time based on the movement amount. Then, the movement control unit 223 outputs the computed reproduction time in the form of the reproduction time data to the beat density analyzing unit 300, the audio editing unit 200, and the audio signal generating unit 210.

For example, the movement control unit 223 sets the reproduction time which is initially reproduced in the content data to one end portion of the operation area OF while setting the reproduction time for indicating the reproduction time length of the content data to the other end portion of the operation area OF. When the movable operator MF is moved according to the reproduction of the content data, the track elapsed-time data which is of the output from the reproduction-position detecting unit 311 is inputted to the movement control unit 223. The movement control unit 223 computes the position corresponding to the horizontal axis (time) of the beat density display area A1 based on the track elapsed-time at the time indicated by the inputted track elapsed-time data, and the movement control unit 223 moves the movable operator MF to the computed position. When the user slides the movable operator MF, the movement control unit 223 computes the reproduction time of the content data based on the movement amount of the movable operator MF between the start time set in the operation area OF and the end time and the length of the operation area OF, and the movement control unit 223 outputs the computed reproduction time in the form of the reproduction time data to the beat density analyzing unit 300, the audio editing unit 200, and the audio signal generating unit 210. However, the movement control unit 223 of the first embodiment controls a motor M shown in FIG. 6 to slide and move the movable operator MF.

As described above, during the reproduction of the content data, the movement control unit 223 moves the movable operator MF such that the center of the movable operator MF corresponds to the reproduction time of the contents indicated by the beat density data, which is displayed on the display unit 221. When the user compares the sliding and moving movable operator MF to the beat density displayed on the beat density display area A1, the user can easily visually determine that the feature portion such as "catchy part" of the song being reproduced is reproduced when how much time elapses from the present time.

On the other hand, the movement control unit 223 detects whether or not the user makes contact with the movable operator MF. When the movement control unit 223 detects that the user makes contact with the movable operator MF, the movement control unit 223 notifies the system control unit 260 of the contact of the user. When the movement control unit 223 detects that the user makes contact with the movable operator MF during the reproduction of the content data, the movement control unit 223 notifies the system control unit 260 of the contact of the user to stop the reproduction of the content data.

The detailed reproducing process based on operation of an operator in the system control unit 260 of the first embodiment will be described below with reference to FIGS. 7 and 8.

Figure 7:
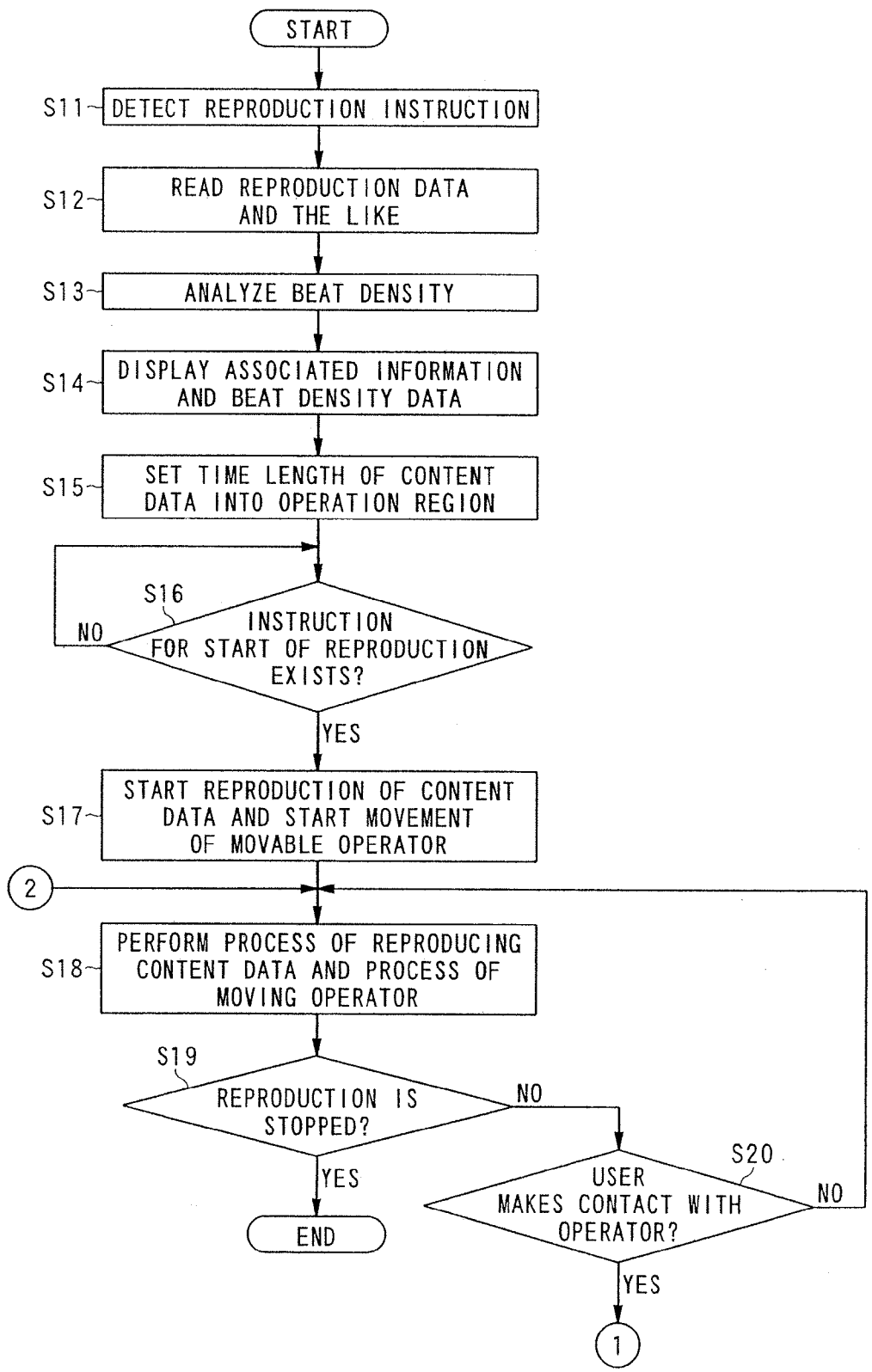
FIG. 7 is a flowchart (I) showing action of a reproducing process based on operation of an operator in a system control unit of the first embodiment.
Figure 8:
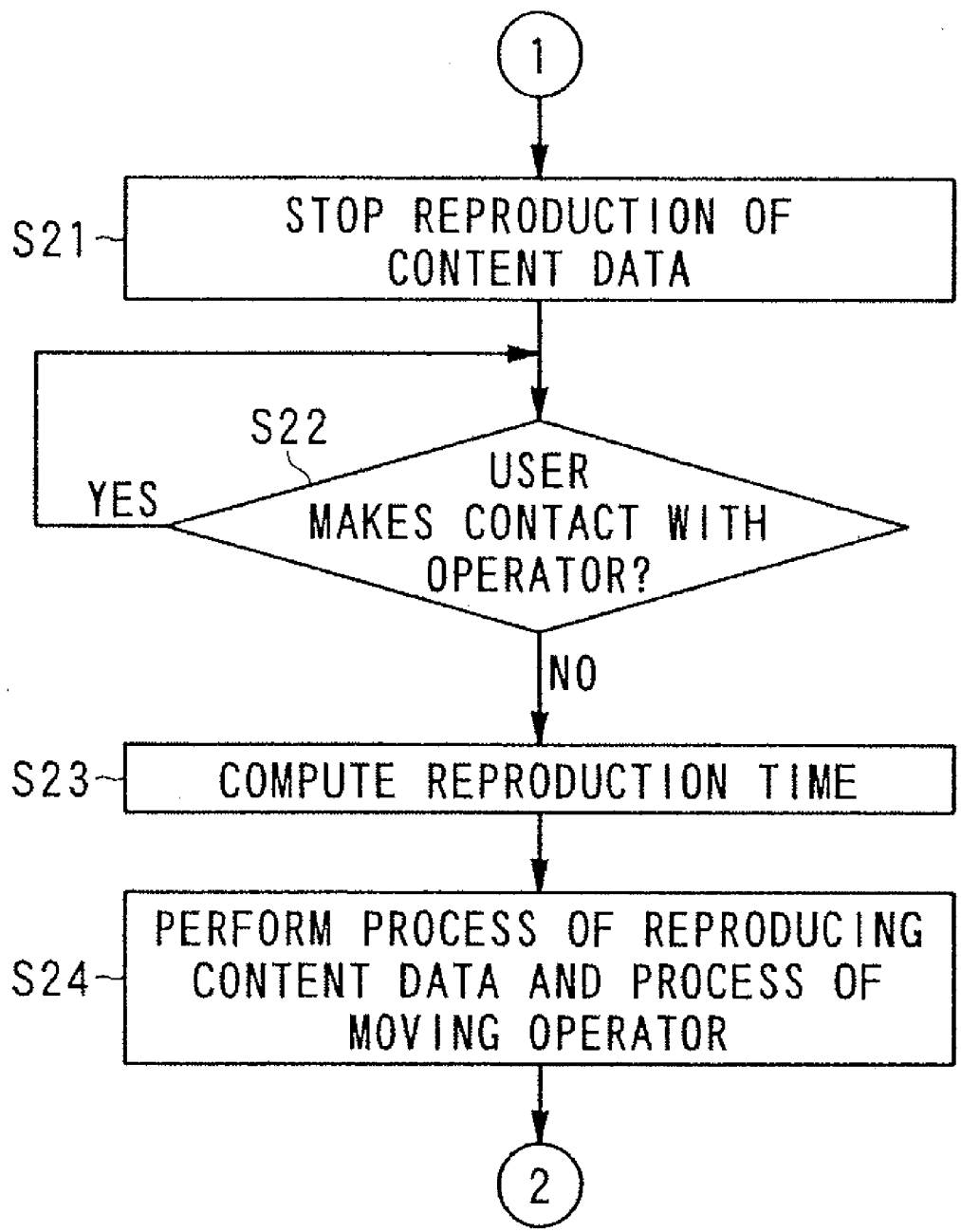
FIG. 8 is a flowchart (II) showing the action of the reproducing process based on the operation of the operator in the system control unit of the first embodiment.

FIGS. 7 and 8 are a flowchart showing action of the reproducing process based on the operation of the operator in the system control unit 260 of the first embodiment.

In the following description of the action, it is assumed that the particular optical disk 10 is already loaded in the optical disk reproducing apparatus 100, and it is assumed that the reproducing process is performed in the order of the data structure of the content data after the reproduction time is specified by the operation input unit 230.

Additionally, it is assumed that the entire pack data PD of the content data which is of a reproduction target is previously stored in the ring buffer memory RBM.

That the arbitrary content data recorded in the optical disk 10 is reproduced is inputted by the operation input unit 230, and the system control unit 260 detects the instruction for the reproduction of the content data (Step S11). Then, the system control unit 260 controls the optical pickup 110, the spindle motor 130, and the like to read the control data and reproduction data of the content data from the optical disk 10 (Step S12).

Then, the system control unit 260 causes the control data decoding unit 180 to extract the sub-code data from the read control data, the system control unit 260 causes the beat density analyzing unit 300 to analyze the beat density of the content data to generate the beat density data based on the sub-code data and the reproduction data (Step S13).

Specifically, as described above, the beat density analyzing unit 300 associates the inputted sub-code data and reproduction data with each other to generate the pack data PD having the predetermined data structure, and the beat density analyzing unit 300 generates the bit density data from the generated pack data PD while storing the generated pack data PD in the ring buffer memory RBM.

Then, the system control unit 260 controls the display control unit 222 to display the associated information on the extracted content data on the display unit 221 based on the sub-code data, and the system control unit 260 controls the display control unit 222 to display the beat density of the entire content data on the display unit 221 based on the generated beat density data (Step S14).

Then, the system control unit 260 controls the movement control unit 223 to set the time length of the content data indicated by the beat density data to the operation area OF of the movable operator MF, the system control unit 260 notifies the user that the content data can be reproduced, and the system control unit 260 waits for the input of the reproduction start of the content data (Step S15).

In the first embodiment, when the time length of the content data is set to the operation area O of the movable operator MF, for example, the movement control unit 223 sets the reproduction time initially reproduced in the content data at one end portion of the operation area OF, and the movement control unit 223 sets the reproduction time for indicating the reproduction time length of the content data at the other end portion of the operation area OF. Therefore, the movement control unit 223 sets the time length of the content data to the operation area OF of the movable operator MF.

Then, the instruction for the reproduction start from arbitrary time is provided by the operation of the operation input unit 230 such as the jog dial. When the system control unit 260 detects the instruction (Step S16), the system control unit 260 controls the beat density analyzing unit 300, the audio editing unit 200, and the audio signal generating unit 210 to reproduce the content data from the specified reproduction time based on the operation instruction of the operation input unit 230, and the system control unit 260 causes the movement control unit 223 to slide and move the movable operator MF to the operation area OF in which the specified reproduction time is set (Step S17).

Specifically, when the reproduction time for starting the reproduction of the content data is specified by the operation input unit 230, the beat density analyzing unit 300 reads the pack data PD corresponding to the reproduction time from the ring buffer memory RBM, and the beat density analyzing unit 300 outputs the reproduction data of the read pack data PD to the audio editing unit 200 and the audio signal generating unit 210 to sound the external device such as the speaker. The reproduction-position detecting unit 311 inputs the track elapsed-time data to the movement control unit 223, the movement control unit 223 computes the position of the operation area OF corresponding to the track elapsed-time indicated by the inputted track elapsed-time data, and the movement control unit 223 slides the movable operator MF to the computed position. The display control unit 222 causes the display unit 221 to start the display of the associated information on the content data such as the elapsed time in the reproduction of the content data based on the inputted sub-code data.

Then, the system control unit 260 controls the beat density analyzing unit 300, the audio editing unit 200, and the audio signal generating unit 210 to perform the process of reproducing the content data (hereinafter simply referred to as reproducing process), the system control unit 260 controls the movement control unit 223 to perform the process of moving the movable operator MF (hereinafter simply referred to as moving process), and the system control unit 260 performs the process of displaying the associated information on the content data on the display unit 221 (hereinafter simply referred to as display process) (Step S18).

Specifically, the system control unit 260 causes the read address controller 303 to read the pack data PD from the ring buffer in the order of the address, the system control unit 260 performs the predetermined process to the reproduction data of the pack data PD in the audio editing unit 200 and audio signal reproducing unit to sound the external device such as the speaker. The system control unit 260 sequentially displays the associated information on the display unit 221 based on the sub-code data in the pack data PD read from the ring buffer memory RBM. The system control unit 260 also causes the movement control unit 223 to compute a particular position in the operation area OF based on the elapsed-time data to move the movable operator MF to the computed position.

Then, the system control unit 260 detects whether or not the user inputs the reproduction stop through the operation input unit 230, and the system control unit 260 detects whether or not the pack data PD to be reproduced exists in the ring buffer memory RBM. Therefore, the system control unit 260 determines that the reproduction of the content data is stopped (Step S19).

When the instruction for the stop of the reproduction is inputted to the system control unit 260 through the operating unit, or when the system control unit 260 detects that the pack data PD to be reproduced does not exist in the ring buffer memory RBM, the system control unit 260 ends the action.

On the other hand, when no instruction for the stop of the reproduction is inputted to the system control unit 260 through the operating unit, or when the system control unit 260 determines that the pack data PD to be reproduced exists in the ring buffer memory RBM, the system control unit 260 causes the movement control unit 223 to determine whether or not the user makes contact with the movable operator MF (Step S20).

When the movement control unit 223 determines that the user does not make contact with the movable operator MF, the system control unit 260 transfers to the process in Step S18.

On the other hand, when the movement control unit 223 determines that the user makes contact with the movable operator MF, the system control unit 260 controls the beat density analyzing unit 300, the audio editing unit 200, and the audio signal generating unit 210 to stop the process of reproducing the content data (Step S21).

Then, the system control unit 260 causes the movement control unit 223 to determine whether or not the user makes contact with the movable operator MF at predetermined time intervals (Step S22). When the movement control unit 223 determines that the user does not make contact with the movable operator MF, the system control unit 260 causes the movement control unit 223 to compute the reproduction time corresponding to the position in the operation area OF of the movable operator MF, and the system control unit 260 causes the movement control unit 223 to output the computed reproduction time in the form of the reproduction time data to each unit (Step S23).

Then, on the basis of the computed reproduction time data, the system control unit 260 controls the beat density analyzing unit 300, the audio editing unit 200, and the audio signal generating unit 210 to start the reproduction of the content data from the reproduction time indicated by the reproduction time data, the system control unit 260 controls the movement control unit 223 to slide and move the movable operator MF to the operation area OF in which the specified reproduction time is set, and the system control unit 260 transfers to the process in Step S18 (Step S24).

Specifically, the beat density analyzing unit 300 reads the pack data PD corresponding to the reproduction time from the ring buffer memory RBM, and the beat density analyzing unit 300 outputs the reproduction data of the read pack data PD to the audio editing unit 200 and the audio signal generating unit 210 to sound the external device such as the speaker. The display control unit 222 causes the display unit 221 to start the display of the associated information on the content data such as the elapsed time in reproducing the content data based on the inputted sub-code data.

Thus, according to the first embodiment, the optical disk reproducing apparatus 100 reproduces the content data having the predetermined time length, and the optical disk reproducing apparatus 100 includes the control data decoding unit 180 and audio data decoding unit 160 which acquires the content data and the sub-code data (elapsed-time information) indicating the elapsed time in reproducing the content data; the beat density analyzing unit 300 which analyzes the change in amount of information according to the elapsed time in reproducing the content data based on the acquired content data and sub-code data; the display control unit 222 which displays the change in amount of information on the content data according to the elapsed time in a form of level information on the display unit 221, the change in amount of information on the content data according to the elapsed time being analyzed in a whole of the acquired content data; the reproduction-time specification operating unit 220 having the movable operator MF, a user being able to directly make contact with the movable operator MF, the movable operator MF being directly moved within the predetermined operation area OF according to the operation of the user, the movable operator MF being used in specifying the start time for starting the reproduction of the acquired content data from arbitrary time; and the system control unit 260 which performs the reproduction of the content data from the start time specified by the movable operator MF.

According to the above configuration, in the optical disk reproducing apparatus 100 of the first embodiment, when the user operates the movable operator MF to specify each time which is indicated by the sub-code data of the content data at each operation position within the operation area OF, the content data is reproduced from the specified reproduction time.

Accordingly, in the optical disk reproducing apparatus 100 of the first embodiment, because the movable operator MF is moved while corresponding to the display area in which the beat density data is displayed, the feature portion of the content data can visually be understood during the reproduction, and the reproduction time of the content data to be reproduced can properly be specified. As a result, the optical disk reproducing apparatus 100 of the first embodiment can easily perform the operation for designating the reproduction time while directly and intuitively designating the reproduction time, as desired by the user.

In the optical disk reproducing apparatus 100 of the first embodiment, the display unit 221 has the beat density display area A1 where the level information on the whole of the content data is simultaneously displayed, and the reproduction-time specification operating unit 220 has the movable operator MF which is moved within the operation area OF corresponding to the beat density display area A1 of the level information.

According to the above configuration, in the optical disk reproducing apparatus 100 of the first embodiment, because the movable operator MF is moved while corresponding to the display area in which the beat density data of the entire content data is displayed, the feature portion of the music can visually be understood during the reproduction, and the reproduction time of the content data to be reproduced can properly be specified.

In the optical disk reproducing apparatus 100 of the first embodiment, the reproduction-time specification operating unit 220 has the operation area OF which includes one end portion provided along with one end portion of the beat density display area A1 and the other end portion provided along with the other end portion of the beat density display area A1.

According to the above configuration, in the optical disk reproducing apparatus 100 of the first embodiment, the beat density display area A1 and the operation area OF of the reproduction-time specification operating unit 220 are simultaneously provided, and the movable operator MF is moved while corresponding to the display area where the beat density data is displayed. Therefore, the feature portion of the music can visually be understood during the reproduction, and the reproduction time of the content data to be reproduced can properly be specified.

The optical disk reproducing apparatus 100 of the first embodiment further includes the movement control unit 223 which moves the operator according to the reproduction of the content data while specifying the level information on the reproduction time of the content data in the display unit 221.

According to the above configuration, in the optical disk reproducing apparatus 100 of the first embodiment, the movable operator MF is moved according to the reproduction of the content data while the level information on the reproduction time of the content data is specified. Therefore, the level information designated by the reproduction time can easily and properly be grasped while the reproduction time of the content data is confirmed by the movable operator MF.

The optical disk reproducing apparatus 100 of the first embodiment further includes the movement control unit 223 which detects whether or not the user makes contact with the operator when the content data is reproduced, wherein the system control unit 260 stops the reproduction of the content data when the movement control unit 223 detects that the user makes contact with the operator.

According to the above configuration, in the optical disk reproducing apparatus 100 of the first embodiment detects whether or not the user makes contact with movable operator MF.

In the optical disk reproducing apparatus 100 of the first embodiment, the user can recognize the movement of the movable operator MF during the reproduction of the content data even if the user moves the movable operator MF. Therefore, the operation status of the movable operator MF can be interlocked with the reproduction action of the content data such that the reproduction of the content data is stopped when the user recognizes the movement of the movable operator MF during the reproduction of the content data, and such that the reproduction is started from the position of the operation area OF where the movable operator MF is moved when the user recognizes the movement of the movable operator MF after the reproduction of the content data is stopped. As a result, the optical disk reproducing apparatus 100 of the first embodiment can reproduce the content data according to the operation status performed by the user while directly and intuitively designating the reproduction time, as desired by the user.

The optical disk reproducing apparatus 100 of the first embodiment further includes the movement control unit 223 which computes the reproduction time of the content data corresponding to a position in the operation area OF indicated by the movable operator MF, when the system control unit 260 stops the reproduction of the content data and, at the same time, when the movement control unit 223 detects that the user does not make contact with the movable operator MF, wherein the beat density analyzing unit 300 resumes the reproduction of the content data from the computed reproduction time.

According to the above configuration, in the optical disk reproducing apparatus 100 of the first embodiment, the reproduction can be started from the position of operation area OF where the movable operator MF is moved, when the user recognizes the movement of the movable operator MF and, at the same time, when the user recognizes the movement end of the movable operator MF after the reproduction of the content data is stopped. Therefore, the content data can be reproduced according to the operation status performed by the user while the reproduction time is directly and intuitively designated as desired by the user.

On the other hand, according to the first embodiment, the optical disk reproducing apparatus 100 reproduces content data having a predetermined time length, and the optical disk reproducing apparatus 100 includes the control data decoding unit 180 and audio data decoding unit 160 which acquire the content data and the time length data indicating the time length in reproducing the content data; the reproduction-time specification operating unit 220 having the movable operator MF, the user being able to directly make contact with the movable operator MF, the movable operator MF being directly moved within the predetermined operation area OF according to operation of the user, the movable operator MF being used in specifying the start time for starting the reproduction of the acquired content data from arbitrary time; the system control unit 260 which causes the reproduction time of the content data to correspond to an operation range of the movable operator MF based on the acquired time length data, the system control unit 260 reproducing the content data from the start time specified by the movable operator MF; and the movement control unit 223 which moves the movable operator MF within the operation range according to the reproduction of the content data, the movement control unit 223 detecting whether or not the user makes contact with the movable operator MF, wherein the system control unit 260 stops the reproduction of the content data, when the movement control unit 223 detects that the user makes contact with the operator during the reproduction of the content data.

According to the above configuration, in the optical disk reproducing apparatus 100 of the first embodiment, the movable operator MF is moved in the operation range according to the reproduction of the content data, the optical disk reproducing apparatus 100 detects that the user makes contact with the movable operator MF and stops the reproduction of the content data when detecting that the user makes contact with the movable operator MF during the reproduction of the content data.

Accordingly, in the optical disk reproducing apparatus 100 of the first embodiment, the reproduction time can visually be understood during the reproduction of the content data, and the reproduction time of the content data can easily and smoothly be specified when the user changes the reproduction time during the reproduction. As a result, the optical disk reproducing apparatus 100 of the first embodiment can easily perform the operation for designating the reproduction time while directly and intuitively designating the reproduction time, as desired by the user.

In the optical disk reproducing apparatus 100 of the first embodiment, when the movement control unit 223 detects that the user does not make contact with the movable operator MF in stopping the reproduction of the content data, the reproduction time of the content data corresponding to the position of the operation area OF which is indicated by the movable operator 223 is specified, and the beat density analyzing unit 300 resumes the reproduction of the content data from the specified reproduction time.

According to the above configuration, in the optical disk reproducing apparatus 100 of the first embodiment, when the user takes off the movable operator MF after operating the movable operator MF to specify the movable operator MF at an arbitrary position within the operation area OF, because the reproduction is started from the reproduction time corresponding to the specified position, the content data can easily and smoothly be reproduced.

In the optical disk reproducing apparatus 100 of the first embodiment, when the control data decoding unit 180 and the audio data decoding unit 160 acquire the content data and the sub-code data indicating the elapsed time in reproducing the content data, the movement control unit 223 controls the movable operator MF according to the reproduction time of the content data based on the sub-code data which is acquired during the reproduction of the content data.

According to the above configuration, in the optical disk reproducing apparatus 100 of the first embodiment, the movable operator MF can be moved according to the reproduction time during the reproduction of the content data, and the reproduction time of the content data can visually be understood during the reproduction. Therefore, the optical disk reproducing apparatus 100 can easily perform the operation for designating the reproduction time while directly and intuitively designating the reproduction time, as desired by the user.

The optical disk reproducing apparatus 100 of the first embodiment further includes the beat density analyzing unit 300 which analyzes the change in amount of information according to the elapsed time in reproducing the content data based on the acquired content data and sub-code data; and the display control unit 222 which displays the change in amount of information on the content data according to the elapsed time in the form of the level information on the display unit 221, the change in amount of information on the content data according to the elapsed time being analyzed in the whole of the acquired content data, wherein the reproduction-time specification operating unit has the movable operator MF which is moved within the operation area OF corresponding to the display area of the level information.

According to the above configuration, in the optical disk reproducing apparatus 100 of the first embodiment, similarly, when the user operates the movable operator MF to specify each time indicated by the sub-code data of the content data at each operation position within the operation area OF, the content data is reproduced from the specified reproduction time.

Accordingly, in the optical disk reproducing apparatus 100 of the first embodiment, because the movable operator MF is moved while corresponding to the display area in which the beat density data is displayed, the feature portion of the content data can visually be understood during the reproduction, and the reproduction time of the content data to be reproduced can properly be specified. As a result, the optical disk reproducing apparatus 100 of the first embodiment can easily perform the operation for designating the reproduction time while directly and intuitively designating the reproduction time, as desired by the user.

In the system control unit 260, the data may be transmitted to and received from the memory card 20 inserted into the memory card storage unit 250, and the beat density analysis and the control of the movable operator MF may be performed by acquiring the predetermined data based on the instruction signal which is inputted through the operating unit by the user.

In this case, the already-analyzed beat density data and other pieces of control data such as the TOC data of the content data are stored in the memory card 20, and the reproducing process is performed based on the operation of the operator using the control data and the beat density data. However, the pack data PD which is read from the loaded optical disk 10 and generated is stored in the ring buffer memory RBM.

The first embodiment is described as the special reproducing apparatus which perform the special reproduction of the music data, namely, the reproducing apparatus in which the data of the song is used as the content data to cause the display area of the beat density data to correspond to the operation area OF of the movable operator MF and thereby the reproducing process is performed. However, the first embodiment can also be applied to an optical disk reproducing apparatus which performs the reproducing process based on the operation of the operator in moving image data.

In this case, in each image data constituting the moving image data, an information amount indicating a rate of change of each image is detected in place of the beat density data, as with the beat density data, a level of the detected information amount indicating the rate of change of each image is displayed as the level information on the display unit 221 along with the elapsed time. For example, when the MPEG moving image data is used, the level of the information amount of the image data in I picture (intra-coded picture) having a characteristic in which a complete frame image can be reproduced only by the image of itself is displayed as the level information associated with the elapsed time on the display unit 221. That is, in the image data, because the information amount indicating the rate of change of the image is increased at the position where the scene is changed, the leading-end image of the scene can be specified by the level information of the information amount. The MEPG image data is stored as the reproduction data in the ring buffer memory RBM. Accordingly, in this case, when the moving image data is reproduced, or when the moving image data is edited, the optical disk reproducing apparatus is used as the reproducing apparatus which continuously reproduces the moving image data and, as with the reproduction of the music data, the optical disk reproducing apparatus can be used as the special reproducing apparatus which performs the special reproduction such as the function of performing the reproduction while the rotating speed of the optical disk is operated by the user and the function of repeatedly reproducing the particular data portion of the music data.

The movement control unit 223 of the first embodiment computes the position of the operation area OF in which the movable operator MF is moved based on the inputted elapsed-time data, the movement control unit 223 computes the movement amount of the movable operator MF slid by the operation of the user based on the arbitrary position in the operation area OF, and the movement control unit 223 computes the reproduction time based on the computed movement amount. Alternatively, memories are provided at constant intervals in the operation area OF, the movement control unit 223 allocates the reproduction time to each memory based on the time length of the content data, and thereby the reproduction time may be specified or the slide action of the movable operator MF may be controlled.

In the optical disk reproducing apparatus 100 of the first embodiment, the display unit 221 in which the beat density data and other pieces of data are displayed is provided in the optical disk reproducing apparatus 100. Alternatively, only the display unit 221 may be connected as the external device.

Second Embodiment

An optical disk reproducing apparatus according to a second embodiment of the invention which reproduces the optical disk will be described below with reference to FIGS. 9 to 11.

The optical disk reproducing apparatus of the second embodiment differs from the reproduction-time specification operating unit of the first embodiment in that a touch panel (also called touch pad, hereinafter referred to as position designation detecting device) which is of a contact movable operator having a touch sensing function is used in place of the movable operator whose action can be controlled. Other configurations of the second embodiments are similar to those of the first embodiment, the same member is designated by the same numeral, and the description will not be described.

A configuration of a reproduction-time specification operating unit of the second embodiment will be described with reference to FIG. 9. FIG. 9 is a block diagram showing the configuration of the reproduction-time specification operating unit of the second embodiment.

Figure 9:
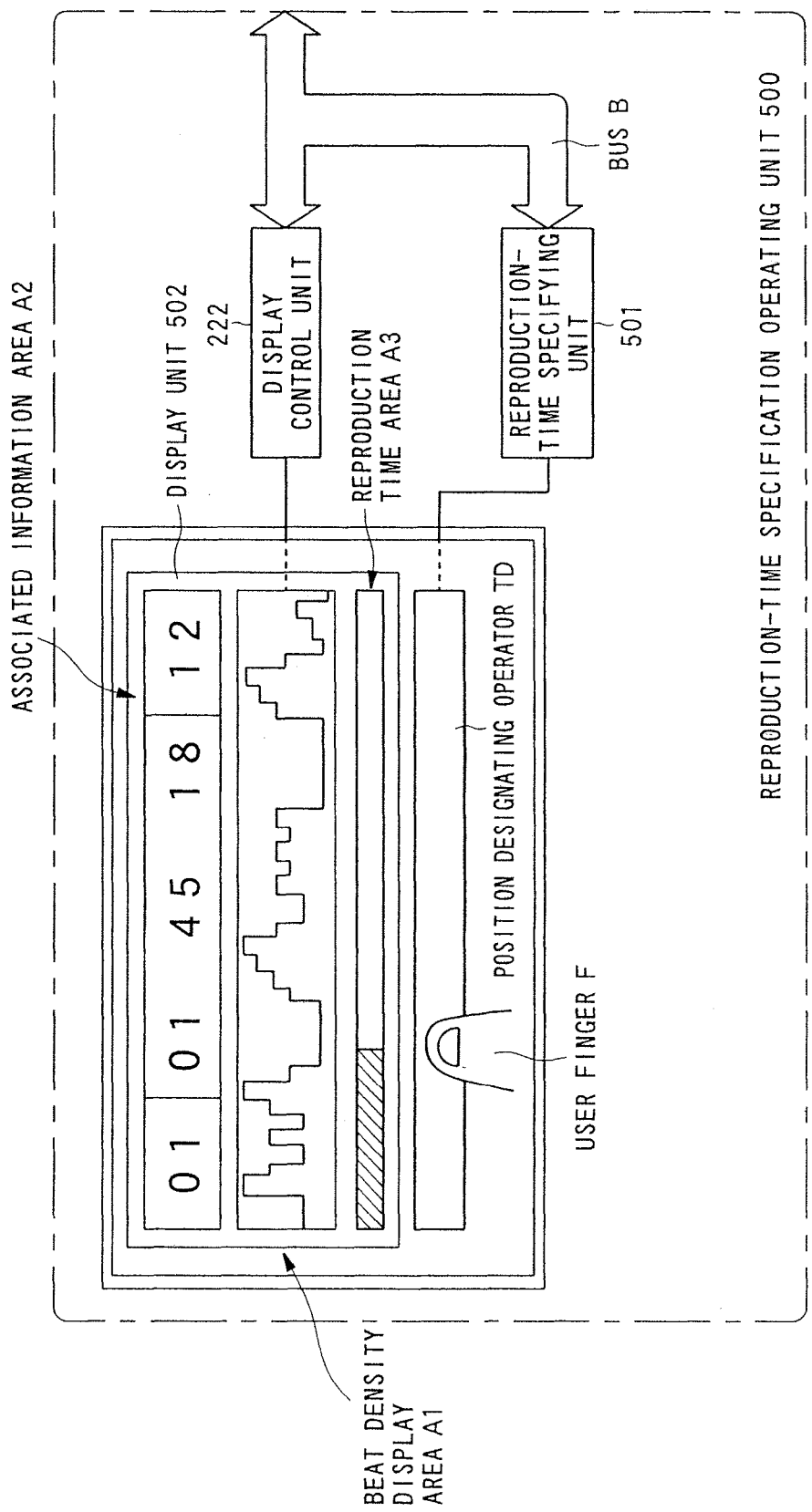
FIG. 9 is a block diagram showing a configuration of a reproduction-time specification operating unit according to a second embodiment.

As shown in FIG. 9, a reproduction-time specification operating unit 500 of the second embodiment has a display unit 502, the display control unit 222, a position designating operator TP, and a reproduction-time specifying unit 501. The position designating operator TP is provided along with the display area in which the beat density data is displayed, and the position designating operator TP is used to specify the start time for starting the reproduction of the content data from an arbitrary time. The reproduction-time specifying unit 501 causes the time length of the entire content data to the operation area OF of the movable operator MF of the operation area OF. When the arbitrary position is designated by the position designating operator TP, the reproduction-time specifying unit 501 specifies the reproduction time based on the designated position.

The display unit 502 of the second embodiment constitutes the display means of the invention, and the display control unit 222 constitutes the display control means of the invention. The position designating operator TP of the second embodiment constitutes the operator of the invention, and the reproduction-time specifying unit 501 constitutes the specifying means of the invention.

The position designating operator TP is arranged adjacent to the beat density display area A1, the position designating operator TP can designate the arbitrary position within the predetermined operation area OF and can designate the reproduction time corresponding to the beat density data displayed on the display unit 502. The position designating operator TP can designate the arbitrary position within the operation area OF which has one end portion provided along with one end portion of the beat density display area A1 and the other end portion provided along with the other end portion of the beat density display area A1.

Specifically, the position designating operator TP has a plane structure in the operation area OF. When a finger of the user comes into contact with the surface of the position designating operator TP, the position designating operator TP can recognize the position with which the finger of the user comes into contact as the designated position, and the position designating operator TP outputs the information on the recognized position (hereinafter referred to as positional information) to the reproduction-time specifying unit 501.

For example, the position designating operator TP of the second embodiment is formed by a ribbon controller, and recognizes the position with which the finger of the user comes into contact in the ribbon controller.

In the case where the user comes into contact with the position designating operator TP, when the position designating operator TP recognizes that the finger F of the user continuously comes into contact with the different positions, the position designating operator TP outputs the position, where the finger of the user does not finally come into contact with the position designating operator TP, in the form of the positional information to the reproduction-time specifying unit 501.

The positional information which is of the output from the position designating operator TP and the beat density data of the entire content data which is of the output from the beat density analyzing unit 300 are inputted to the reproduction-time specifying unit 501. The reproduction-time specifying unit 501 causes the time length of the content data indicated by the inputted beat density data to correspond to the operation area OF in the position designating operator TP, the reproduction-time specifying unit 501 specifies the reproduction time of the content data to be reproduced based on the inputted positional information and outputs the computed reproduction time in the form of the reproduction time data to the beat density analyzing unit 300, the audio editing unit 200, and the audio signal generating unit 210.

Specifically, the reproduction-time specifying unit 501 computes the reproduction time of the content data based on the movement amount of the movable operator MF between the start time set into the operation area OF and the end time, the length of the operation area OF, and the inputted positional information, and the reproduction-time specifying unit 501 outputs the computed reproduction time in the form of the reproduction time data to the beat density analyzing unit 300, the audio editing unit 200, and the audio signal generating unit 210.

When the user compares the operation area OF of the position designating operator TP to the beat density displayed on the beat density display area A1, the user can easily visually determine that the feature portion such as "catchy part" of the song being reproduced is reproduced when how much time elapses from the present time.

As with the first embodiment, the beat density analyzing unit 300, the audio editing unit 200, and the audio signal generating unit 210 perform the processes of reading and reproducing the reproduction data based on the reproduction time data outputted from the reproduction time setting unit.

The display unit 502 has plural display areas formed by a liquid crystal display device. As shown in FIG. 9, the beat density display area A1, the associated information display area A2, and a reproduction time area A3 are provided in the display unit 502. The beat density data is displayed in the beat density display area A1. The track number of the content data being reproduced, extracted from the TOC data which is of the output from the system control unit 260, and the number of tracks recorded in the optical disk are displayed in the associated information display area A2. During the reproduction of the content data, the reproduction time for the entire reproduction time of the content data is visually displayed in the reproduction time area A3.

In the second embodiment, as with the first embodiment, the beat density data is displayed in the beat density display area A1. In the beat density display area A1, the track elapsed-time is set to the horizontal axis of the content data having the predetermined time length while the beat density is set to the vertical axis, and the individual beat density is vertically displayed in the bar graph shape in each track elapsed-time.

As with the first embodiment, in the associated information display area A2, the track number in which the music being reproduced is recorded, the digital numerical value of the track elapsed-time at the present time, and the total number of tracks indicating the total number of songs recorded in the optical disk 10 are displayed in the associated information display area A2.

The reproduction time in the entire time of the content data is displayed in the reproduction time area A3 during the reproduction of the content data. When the position designating operator TD is operated to instruct the start of the reproduction during the reproduction of the content data, namely, when the finger of the user takes off the position designating operator TP, the reproduction time corresponding to the finger of the user is displayed in the reproduction time area A3.

A reproducing process based on the operation of the operator in the system control unit 260 of the second embodiment will be described below with reference to FIGS. 10 and 11.

Figure 10:
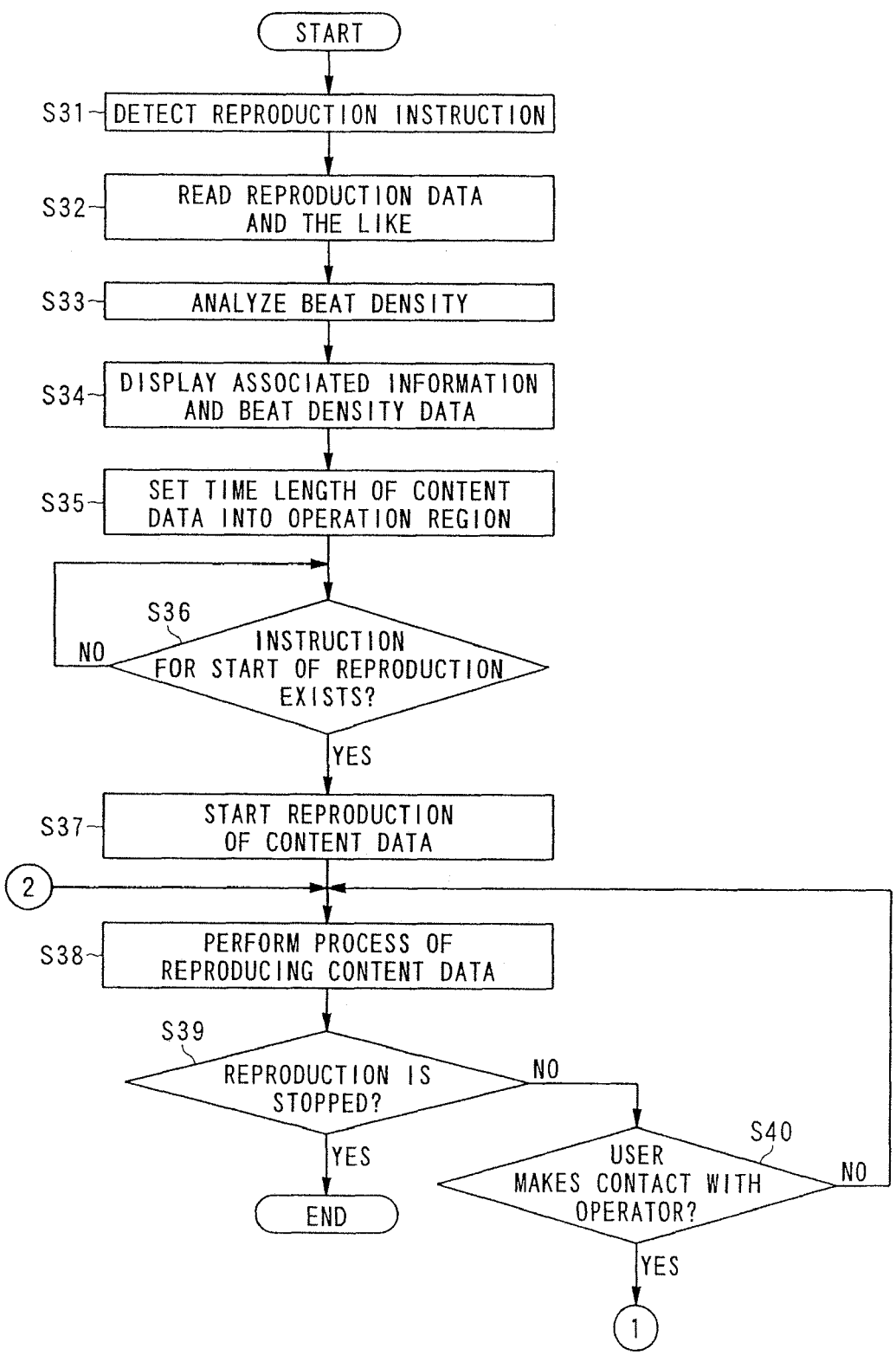
FIG. 10 is a flowchart (I) showing action of a reproducing process based on operation of an operator in a system control unit of the second embodiment.

FIGS. 10 and 11 are a flowchart showing the action of the reproducing process based on the operation of the operator in the system control unit 260 of the second embodiment.

In the following description of the action, it is assumed that the particular optical disk 10 is already loaded in the optical disk reproducing apparatus 100, and it is assumed that the reproducing process is performed in the order of the data structure of the content data after the reproduction time is specified by the operation unit.

Additionally, it is assumed that the entire pack data PD of the content data which is of a reproduction target is previously stored in the ring buffer memory RBM.

That the arbitrary content data recorded in the optical disk 10 is reproduced is inputted by the operation input unit 230, and the system control unit 260 detects the instruction for the reproduction of the content data (Step S31). Then, the system control unit 260 controls the optical pickup 110, the spindle motor 130, and the like to read the control data and reproduction data of the content data from the optical disk 10 (Step S32).

Then, the system control unit 260 causes the control data decoding unit 180 to extract the sub-code data from the read control data, the system control unit 260 causes the beat density analyzing unit 300 to analyze the beat density of the content data to generate the beat density data based on the sub-code data and the reproduction data (Step S33).

Specifically, as with the first embodiment, the beat density analyzing unit 300 associates the inputted sub-code data and reproduction data with each other to generate the pack data PD having the predetermined data structure, and the beat density analyzing unit 300 generates the bit density data from the generated pack data PD while storing the generated pack data PD in the ring buffer memory RBM.

Then, the system control unit 260 controls the display control unit 222 to display the associated information on the extracted content data on the display unit 221 based on the sub-code data and displays the beat density of the entire content data on the display unit 502 based on the generated beat density data (Step S34).

Then, the system control unit 260 controls the reproduction-time specifying unit 501 to set the time length of the content data indicated by the beat density data to the operation area OF of the position designating operator TP, the system control unit 260 notifies the user that the content data can be reproduced, and the system control unit 260 waits for the input of the reproduction start of the content data (Step S35).

In the second embodiment, for example, the reproduction-time specifying unit 501 sets the reproduction time initially reproduced in the content data at one end portion of the operation area OF, and the reproduction-time specifying unit 501 sets the reproduction time for indicating the reproduction time length of the content data at the other end portion of the operation area OF. Therefore, the reproduction-time specifying unit 501 sets the time length of the content data to the operation area OF of the position designating operator TP.

Then, the instruction for the reproduction start from the arbitrary time is provided by the operation of the operation input unit 230 such as the jog dial. When the system control unit 260 detects the instruction (Step S36), the system control unit 260 controls the beat density analyzing unit 300, the audio editing unit 200, and the audio signal generating unit 210 to reproduce the content data from the specified reproduction time based on the operation instruction of the operation input unit 230 (Step S37).

Specifically, as with the first embodiment, when the reproduction time for starting the reproduction of the content data is specified by the operation input unit 230, the beat density analyzing unit 300 reads the pack data PD corresponding to the reproduction time from the ring buffer memory RBM, and the beat density analyzing unit 300 outputs the reproduction data of the read pack data PD to the audio editing unit 200 and the audio signal generating unit 210 to sound the external device such as the speaker. The display control unit 222 causes the display unit 502 to start the display of the associated information on the content data such as the elapsed time in the reproduction of the content data based on the inputted sub-code data.

Then, the system control unit 260 controls the beat density analyzing unit 300, the audio editing unit 200, and the audio signal generating unit 210 to perform the processes of reproducing the content data and of displaying the associated information on the content data on the display unit 502 (Step S38).

Specifically, the system control unit 260 causes the read address controller 303 to read the pack data PD from the ring buffer in the order of the address, the system control unit 260 performs the predetermined process to the reproduction data of the pack data PD in the audio editing unit 200 and audio signal reproducing unit to sound the external device such as the speaker. The system control unit 260 sequentially displays the associated information on the display unit 502 based on the sub-code data in the pack data PD read from the ring buffer memory RBM.

Then, the system control unit 260 detects whether or not the user inputs the reproduction stop through the operation input unit 230, and the system control unit 260 detects whether or not the pack data PD to be reproduced exists in the ring buffer memory RBM. Therefore, the system control unit 260 determines that the reproduction of the content data is stopped (Step S39).

When the instruction for the stop of the reproduction is inputted to the system control unit 260 through the operating unit, or when the system control unit 260 detects that the pack data PD to be reproduced does not exist in the ring buffer memory RBM, the system control unit 260 ends the action.

On the other hand, when no instruction for the stop of the reproduction is inputted to the system control unit 260 through the operating unit and, at the same time, when the system control unit 260 determines that the pack data PD to be reproduced exists in the ring buffer memory RBM, the system control unit 260 causes the reproduction-time specifying unit 501 to determine whether or not the user makes contact with the position designating operator TP (Step S40).

Specifically, the reproduction-time specifying unit 501 determines whether or not the user makes contact with the position designating operator TP based on whether or not the positional information is inputted from the position designating operator TP. When the reproduction-time specifying unit 501 determines that the user does not make contact with the position designating operator TP, the system control unit 260 transfers to the process in Step S38.

On the other hand, when the reproduction-time specifying unit 501 determines that the user makes contact with the position designating operator TP, the system control unit 260 causes the reproduction-time specifying unit 501 to compute the reproduction time corresponding to the position within the operation area OF of the position designating operator TP based on the positional information inputted from the position designating operator TP, and the system control unit 260 outputs the computed reproduction time in the form of the reproduction time data to each unit (Step S41).

Then, on the basis on the computed reproduction time data, the system control unit 260 controls the beat density analyzing unit 300, the audio editing unit 200, and the audio signal generating unit 210 to skip the reproduction of the content data to the reproduction time indicated by the reproduction time data, and the system control unit 260 transfers to the process in Step S38 (Step S42).

Specifically, the beat density analyzing unit 300 reads the pack data PD corresponding to the reproduction time from the ring buffer memory RBM, and the beat density analyzing unit 300 outputs the read pack data PD to the reproduction data audio editing unit 200 and the audio signal generating unit 210 to sound the external device such as the speaker.

Then, on the basis of the inputted sub-code data, the system control unit 260 controls the display control unit 222 to update the associated information on the content data such as the elapsed time during the reproduction of the content data in the display unit 502 (Step S43).

Thus, according to the second embodiment, the optical disk reproducing apparatus 100 reproduces the content data having the predetermined time length, and the optical disk reproducing apparatus 100 includes the control data decoding unit 180 and audio data decoding unit 160 which acquires the content data and the sub-code data (elapsed-time information) indicating the elapsed time in reproducing the content data from the optical disk 10; the beat density analyzing unit 300 which analyzes the change in amount of information according to the elapsed time in reproducing the content data based on the acquired content data and sub-code data; the display control unit 222 which displays the change in amount of information on the content data according to the elapsed time in a form of level information on the display unit 502, the change in amount of information on the content data according to the elapsed time being analyzed in a whole of the acquired content data; the reproduction-time specification operating unit 500 having the position designating operator TP, a user being able to directly make contact with the position designating operator TP, the position designating operator TP being directly moved within the predetermined operation area OF according to the operation of the user, the position designating operator TP being used in specifying the start time for starting the reproduction of the acquired content data from arbitrary time; and the system control unit 260 which performs the reproduction of the content data from the start time specified by the movable operator MF.

According to the above configuration, in the optical disk reproducing apparatus 100 of the second embodiment, when the user operates the position designating operator TP to specify each time which is indicated by the sub-code data of the content data at each operation position within the operation area OF, the content data is reproduced from the specified reproduction time.

Accordingly, in the optical disk reproducing apparatus 100 of the second embodiment, because the movable operator MF is moved while corresponding to the display area in which the beat density data is displayed, the feature portion of the content data can visually be understood during the reproduction, and the reproduction time of the content data to be reproduced can properly be specified. As a result, the optical disk reproducing apparatus 100 of the second embodiment can easily perform the operation for designating the reproduction time while directly and intuitively designating the reproduction time, as desired by the user.

In the optical disk reproducing apparatus 100 of the second embodiment, the display unit 502 has the beat density display area A1 where the level information on the whole of the content data is simultaneously displayed, and the reproduction-time specification operating unit 500 has the movable operator MF which is moved within the operation area OF corresponding to the beat density display area A1 of the level information.

According to the above configuration, in the optical disk reproducing apparatus 100 of the second embodiment, because the movable operator MF is moved while corresponding to the display area in which the beat density data of the entire content data is displayed, the feature portion of the music can visually be understood during the reproduction, and the reproduction time of the content data to be reproduced can properly be specified.

In the optical disk reproducing apparatus 100 of the second embodiment, the reproduction-time specification operating unit 500 has the operation area OF which includes one end portion provided along with one end portion of the beat density display area A1 and the other end portion provided along with the other end portion of the beat density display area A1.

According to the above configuration, in the optical disk reproducing apparatus 100 of the second embodiment, the beat density display area A1 and the operation area OF of the reproduction-time specification operating unit 500 are simultaneously provided, and the movable operator MF is moved while corresponding to the display area where the beat density data is displayed. Therefore, the feature portion of the music can visually be understood during the reproduction, and the reproduction time of the content data to be reproduced can properly be specified.

The optical disk reproducing apparatus 100 of the second embodiment further has the reproduction-time specifying unit 501 which specifies the reproduction time of the content data at each operation position within the operation area OF while causing the time length of the content data to correspond to the operation area OF of the position designating operator TP, wherein, when the user moves the position designating operator TP to specify the arbitrary position in the operation area OF, the reproduction-time specifying unit 501 specifies each time indicated by the elapsed-time information of the content data based on the position of the operation area OF at which the user makes contact with the position designating operator TP.

According to the above configuration, the optical disk reproducing apparatus 100 of the second embodiment can visually understand the feature portion of the content data during the reproduction, and the reproduction time of the content data to be reproduced can properly be specified.

In the system control unit 260, the data may be transmitted to and received from the memory card 20 inserted into the memory card storage unit 250, and the beat density analysis and the control of the movable operator MF may be performed by acquiring the predetermined data based on the instruction signal which is inputted through the operating unit by the user.

In this case, the already-analyzed beat density data and other pieces of control data such as the TOC data of the content data are stored in the memory card 20, and the reproducing process is performed based on the operation of the operator using the control data and the beat density data. However, the pack data PD which is read from the loaded optical disk 10 and generated is stored in the ring buffer memory RBM.

The second embodiment is described as the special reproducing apparatus which perform the special reproduction of the music data, namely, the optical disk reproducing apparatus in which the data of the song is used as the content data to cause the display area of the beat density data to correspond to the operation area OF of the movable operator MF and thereby the reproducing process is performed. However, the second embodiment can also be applied to an optical disk reproducing apparatus which performs the reproducing process based on the operation of the operator in moving image data.

In this case, in each image data constituting the moving image data an information amount indicating a rate of change of each image is detected in place of the beat density data, as with the beat density data, a level of the detected information amount indicating the rate of change of each image data is displayed as the level information on the display unit 502 along with the elapsed time. For example, when the MPEG moving image data is used, the level of the information amount of the image data in the I picture (intra-coded picture) having a characteristic in which the complete frame image can be reproduced only by the image of itself is displayed as the level information associated with the elapsed time on the display unit 502. That is, in the image data, because the information amount indicating the rate of change of the image is increased at the position where the scene is changed, the leading-end image of the scene can be specified by the level information of the information amount. The MEPG image data is stored as the reproduction data in the ring buffer memory RBM. Accordingly, in this case, when the moving image data is reproduced, or when the moving image data is edited, the optical disk reproducing apparatus is used as the reproducing apparatus which continuously reproduces the moving image data and, as with the reproduction of the music data, the optical disk reproducing apparatus can be used as the special reproducing apparatus which performs the special reproduction such as the function of performing the reproduction while the rotating speed of the optical disk is operated by the user and the function of repeatedly reproducing the particular data portion of the music data.

In the optical disk reproducing apparatus 100 of the second embodiment, the display unit 502 in which the beat density data and other pieces of data are displayed is provided in the optical disk reproducing apparatus 100. Alternatively, only the display unit 502 may be connected as the external device.

In the second embodiment, the position designating operator TP is used to only recognize the designation of the position. Alternatively, when the finger F of the user is in contact with the position designating operator TP during the reproduction of the content data, the elapsed time of the content data in the reproduction and the position at which the finger F of the user is in contact with the position designating operator TP may be displayed in the position designating operator TP.

The invention claimed is:

1. An information reproducing control apparatus comprising:
   a display control device for controlling to display a reproducing point in one sequential content data including audio information and/or video information and being able to be reproduced continuously;
   an operating device including an operator, a user being able to directly touch the operator, the operator being used for designating a desired point of the content data as a new reproducing point being a point on the way of the content data and being different from the reproducing point and;
   a specifying device for a) directly specifying a start reproducing point on the way of the contents data corresponding to the new reproducing point during the content data being not reproduced, or b) directly specifying a point on the way of the contents data corresponding to the new reproducing point as a reproducing point of the content data during the content data being reproduced, wherein
   the display control device controls to display a change of the contents data corresponding to elapsed time in reproducing the content data and the reproducing point corresponding to the elapsed time, wherein
   the display control device controls to display the elapsed time on a display device connected to the display control device, and wherein
   the operator has a operation area being touched by the user, the operation area including one end portion provided along with one end portion of a display area of the elapsed time on the display device and the other end portion provided along with the other portion of the display area of the elapsed time on the display device.

2. The information reproducing control apparatus according to claim 1, wherein
   the display control device controls to display a numerical value, the numerical value indicating condition of the reproduction of the content data up to the present time from a start time of the content data.

3. The information reproducing control apparatus according to claim 1, wherein
   the display control device controls to display the user's touch point as the desired point in whole of the content data on the display device.

4. The information reproducing control apparatus according to claim 1, further comprising
   an acquisition device for acquiring the content data and elapsed-time information indicating elapsed time in reproducing the content data;
   an analysis device for analyzing a change in amount of information according to the elapsed time in reproducing the content data and
   wherein the display control device controls to display the analyzed change in amount of information on the display device.

5. The information reproducing control apparatus according to claim 1, wherein
   the operator is used for designating, as the desired point, a last point by the user's touch when a sliding action by the user's touch continues by a predetermined distance.

6. The operating device according to claim 1, wherein
   the operator is a touch pad or a touch panel.

7. A display device being connected to an information reproducing control apparatus, the information reproducing control apparatus comprising:
    a display control device for controlling to display a reproducing point in one sequential content data including audio information and/or video information and being able to be reproduced continuously;
    an operating device including an operator, a user being able to directly touch the operator, the operator being used for designating a desired point of the content data as a new reproducing point being a point on the way of the content data and being different from the reproducing point; and
    a specifying device for a) directly specifying a start reproducing point on the way of the contents data corresponding to the new reproducing point during the content data being not reproduced, or b) directly specifying a point on the way of the contents data corresponding to the new reproducing point as a reproducing point of the content data during the content data being reproduced, wherein
    the display control device controls to display a change of the contents data corresponding to elapsed time in reproducing the content data and the reproducing point corresponding to the elapsed time, wherein
    the display control device controls to display the elapsed time on the display device, wherein
    the operator has a operation area being touched by the user, the operation area including one end portion provided along with one end portion of a display area of the elapsed time on the display device and the other end portion provided along with the other portion of the display area of the elapsed time on the display device, and wherein
    the display device displays the reproducing point in the content data including audio information and/or video information and being able to be reproduced continuously by a controlling by the display control device.

8. An information reproducing control method being executed by an information reproducing control apparatus, the method comprising:
    a display control process of display controlling a reproducing point in one sequential content data including audio information and/or video information and being able to be reproduced continuously;
    a designating process of designating with using an operator included the information reproducing control apparatus, a user being able to directly touch the operator, a desired point of the content data as a new reproducing point being a point on the way of the content data and being different from the reproducing point; and
    a specifying process of a) directly specifying a start reproducing point on the way of the contents data corresponding to the new reproducing point during the content data being not reproduced, or b) directly specifying a point on the way of the contents data corresponding to the new reproducing point as a reproducing point of the content data during the content data being reproduced, wherein
    in the display control process, it is controlled to display a change of the contents data corresponding to elapsed time in reproducing the content data and the reproducing point corresponding to the elapsed time, wherein
    in the display control process, it is controlled to display the elapsed time on a display device connected to the information reproduction control apparatus, and wherein
    the operator has a operation area being touched by the user, the operation area including one end portion provided along with one end portion of a display area of the elapsed time on the display device and the other end portion provided along with the other portion of the display area of the elapsed time on the display device.

9. A non-transitory computer-readable storage medium that stores a computer-executable program, the computer being included in an information reproducing control apparatus, the program causing the computer to perform steps comprising:
    a display control process of display controlling a reproducing point in one sequential content data including audio information and/or video information and being able to be reproduced continuously;
    a designating process of designating with using an operator included the information reproducing control apparatus, a user being able to directly touch the operator, a desired point of the content data as a new reproducing point being a point on the way of the content data and being different from the reproducing point; and
    a specifying process of a) directly specifying a start reproducing point on the way of the contents data corresponding to the new reproducing point during the content data being not reproduced, or b) directly specifying a point on the way of the contents data corresponding to the new reproducing point as a reproducing point of the content data during the content data being reproduced, wherein
    in the display control process, it is controlled to display a change of the contents data corresponding to elapsed time in reproducing the content data and the reproducing point corresponding to the elapsed time, wherein
    in the display control process, it is controlled to display the elapsed time on a display device connected to the information reproducing control apparatus, and wherein
    the operator has a operation area being touched by the user, the operation area including one end portion provided along with one end portion of a display area of the elapsed time on the display device and the other end portion provided along with the other portion of the display area of the elapsed time on the display device.

10. The information reproducing control apparatus according to claim 1, wherein
    the display control device controls to display a change of a beat density of the contents data corresponding to the elapsed time on the display device, wherein
    the display device includes a display area of the beat density, and wherein
    the one end portion of the operation area of the operator is provided along with one end portion of the display area of the beat density and the other end portion of the operation area of the operator is provided along with the other portion of the display area of beat density.

* * * * *